(12) United States Patent
Akiyama et al.

(10) Patent No.: US 10,976,654 B2
(45) Date of Patent: Apr. 13, 2021

(54) ILLUMINATOR AND PROJECTOR

(71) Applicant: SEIKO EPSON CORPORATION, Tokyo (JP)

(72) Inventors: Koichi Akiyama, Matsumoto (JP); Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/603,104

(22) PCT Filed: Mar. 27, 2018

(86) PCT No.: PCT/JP2018/012358
§ 371 (c)(1),
(2) Date: Oct. 4, 2019

(87) PCT Pub. No.: WO2018/186233
PCT Pub. Date: Oct. 11, 2018

(65) Prior Publication Data
US 2020/0310237 A1    Oct. 1, 2020

(30) Foreign Application Priority Data

Apr. 5, 2017  (JP) .............................. JP2017-075271
Mar. 1, 2018  (JP) .............................. JP2018-036866

(51) Int. Cl.
*G03B 21/20*       (2006.01)
*G03B 33/12*       (2006.01)

(52) U.S. Cl.
CPC ....... *G03B 21/2073* (2013.01); *G03B 21/204* (2013.01); *G03B 21/208* (2013.01); *G03B 21/2013* (2013.01); *G03B 33/12* (2013.01)

(58) Field of Classification Search
CPC .... G03B 21/28; G03B 21/204; G03B 21/208; G03B 21/2013; G03B 21/2033;
(Continued)

(56) References Cited

U.S. PATENT DOCUMENTS

2008/0278693 A1    11/2008 Sawai
2012/0147601 A1*   6/2012 Li .............................. F21V 9/08
                                                    362/231
(Continued)

FOREIGN PATENT DOCUMENTS

JP    H11-064789 A    3/1999
JP    2008-281829 A   11/2008
(Continued)

OTHER PUBLICATIONS

Jun. 26, 2018 Search Report issued in International Patent Application No. PCT/JP2018/012358.

*Primary Examiner* — Sultan Chowdhury
(74) *Attorney, Agent, or Firm* — Oliff PLC

(57) ABSTRACT

An illuminator includes a first light source unit that includes a first light source region, a second light source unit, and a light ray flux adjusting system. The first light source region outputs parallelized first color light. The first light source unit outputs first light containing the first color light. The second light source unit outputs parallelized second light thicker than the first light. The second light is formed of second color light having a color different from the color of the first color light. The light ray flux adjusting system is in the optical path of the first light. The difference in thickness between the first light and the second light on the downstream of the light ray flux adjusting system is smaller than the difference in thickness between the first light and the second light on the upstream of the light ray flux adjusting system.

13 Claims, 12 Drawing Sheets

(58) Field of Classification Search
CPC ............ G03B 21/2053; G03B 21/2073; H04N 9/3158; H04N 9/3161; H04N 9/3164
See application file for complete search history.

(56) References Cited

U.S. PATENT DOCUMENTS

| | | |
|---|---|---|
| 2012/0162614 A1 | 6/2012 | Kobayashi et al. |
| 2013/0250253 A1* | 9/2013 | Ogura .................. G03B 21/204 353/85 |
| 2014/0003074 A1 | 1/2014 | Kishimoto |
| 2014/0247429 A1* | 9/2014 | Ogino ................. G03B 21/2066 353/31 |
| 2015/0253653 A1* | 9/2015 | Fujita .................... G03B 33/08 353/31 |
| 2016/0373705 A1* | 12/2016 | Hashizume .......... H04N 9/3158 |
| 2017/0104984 A1* | 4/2017 | Yamagishi ........... H04N 9/3155 |
| 2017/0329212 A1 | 11/2017 | Akiyama |

FOREIGN PATENT DOCUMENTS

| | | |
|---|---|---|
| JP | 2012-141411 A | 7/2012 |
| JP | 2012-199078 A | 10/2012 |
| JP | 2013-065414 A | 4/2013 |
| JP | 2013-145302 A | 7/2013 |
| JP | 2014-153697 A | 8/2014 |
| JP | 2015-102818 A | 6/2015 |
| JP | 2017-204357 A | 11/2017 |

* cited by examiner

[Fig. 1]
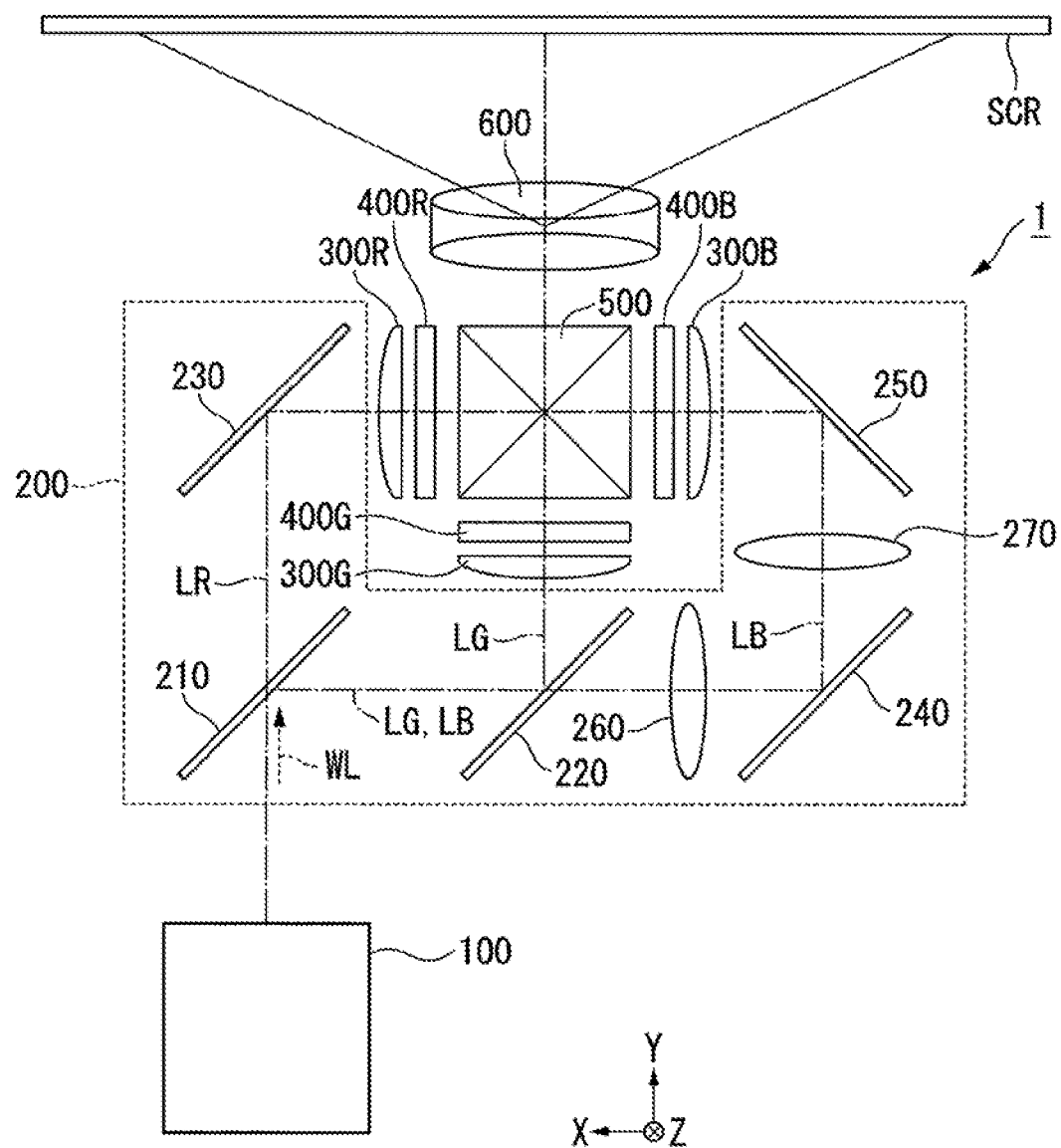

[Fig. 2]
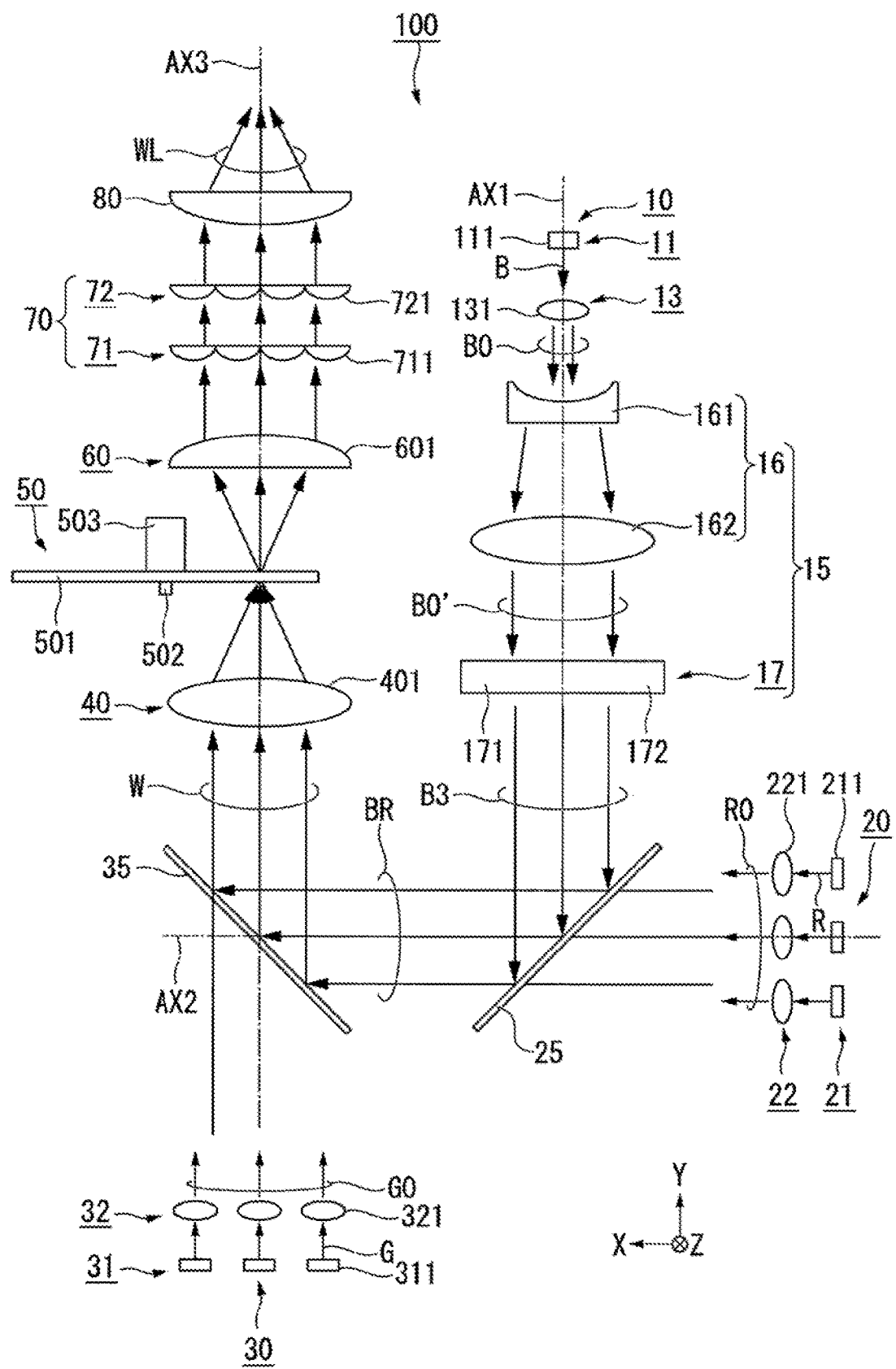

[Fig. 3]
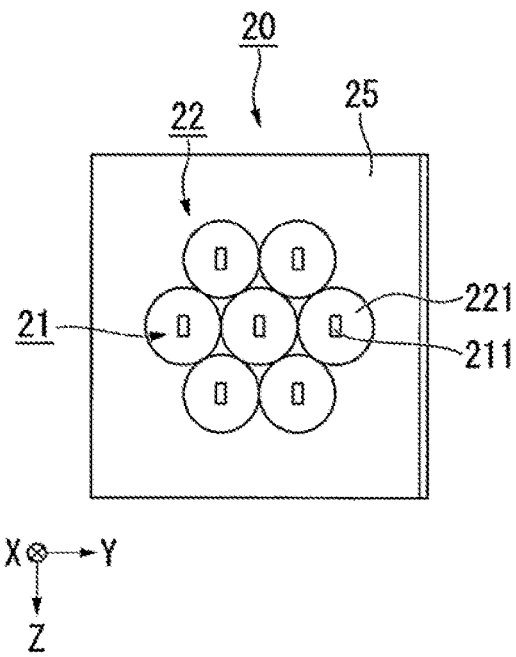
[Fig. 4]
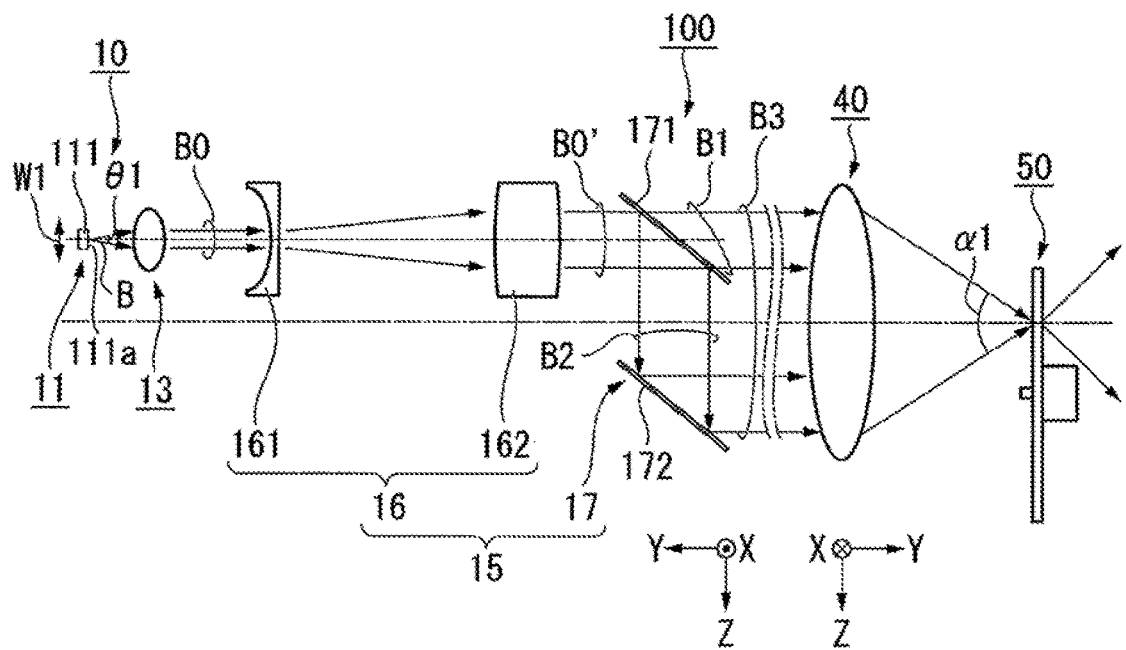

[Fig. 5]
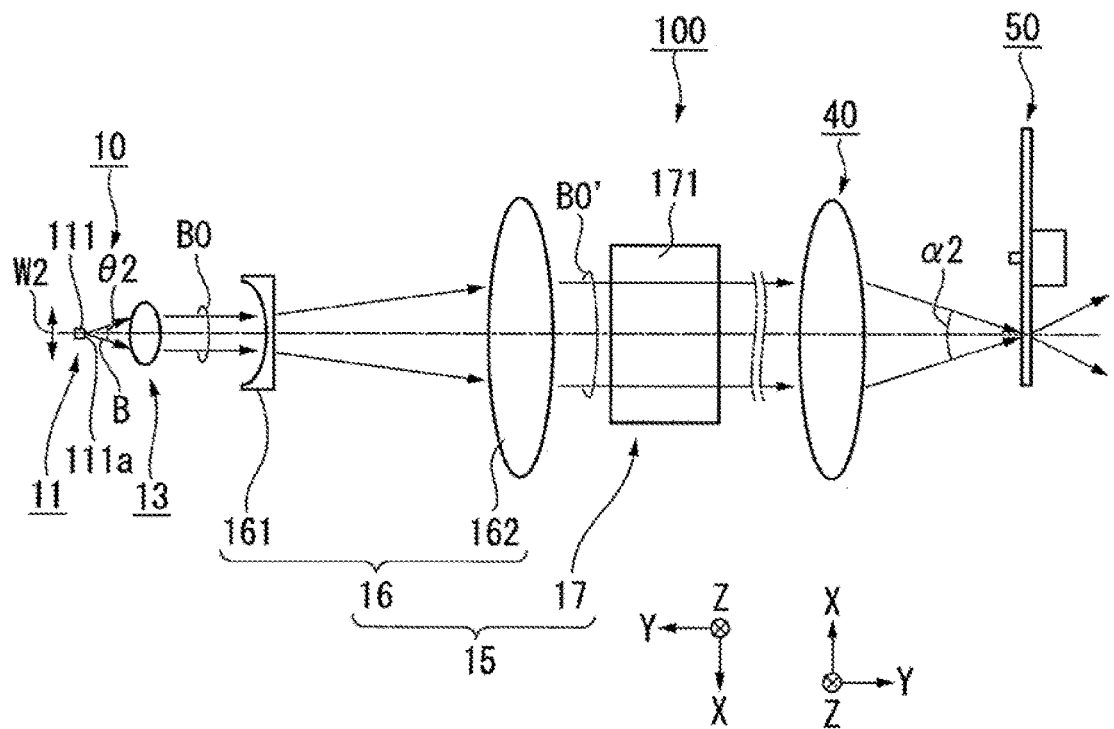
[Fig. 6]
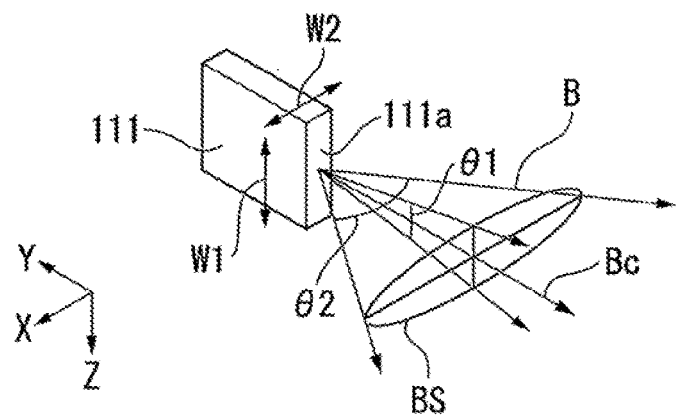

[Fig. 7]
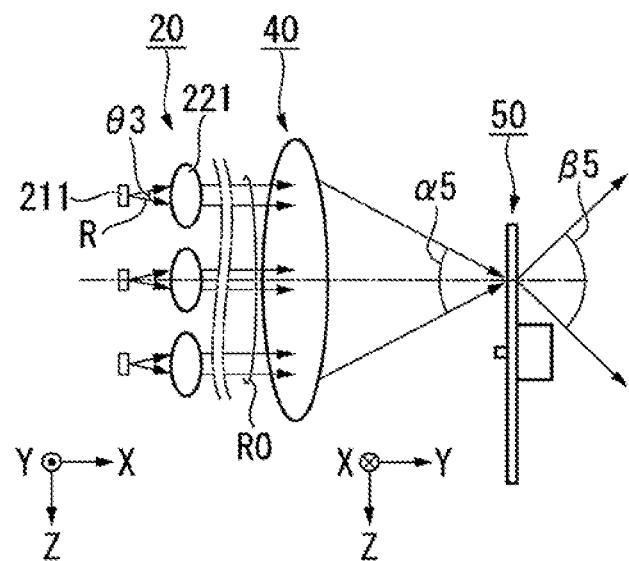
[Fig. 8]
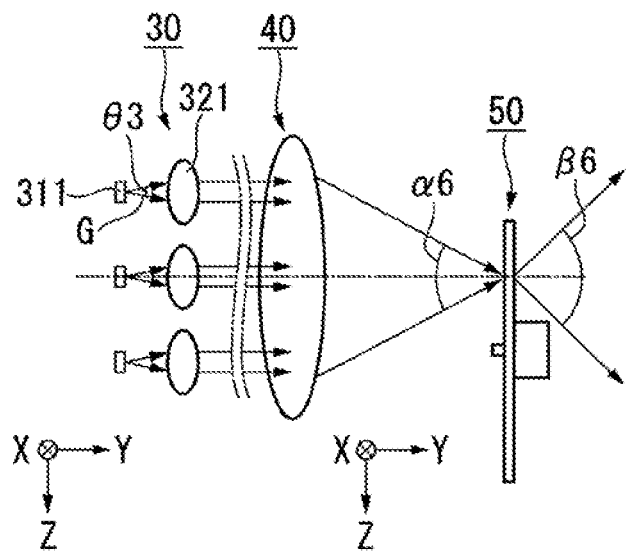

[Fig. 9]
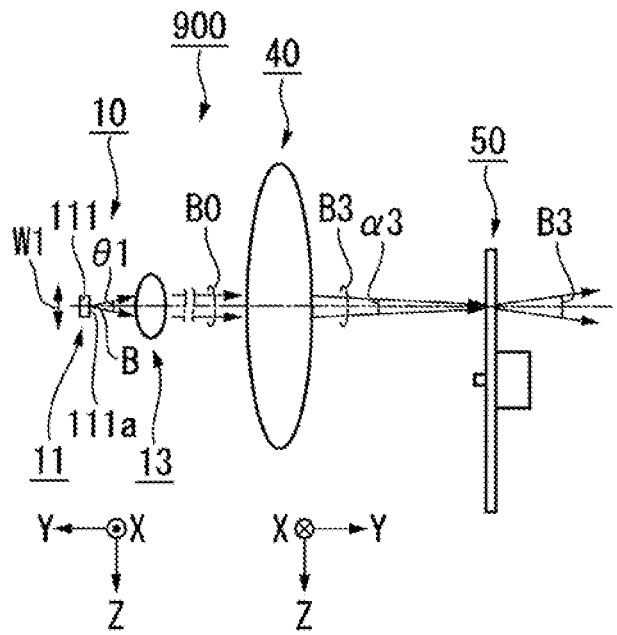
[Fig. 10]
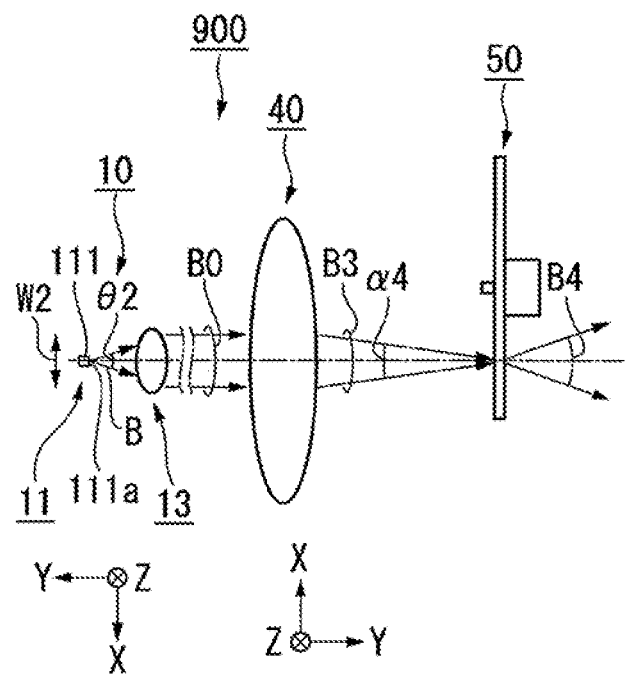

[Fig. 11]
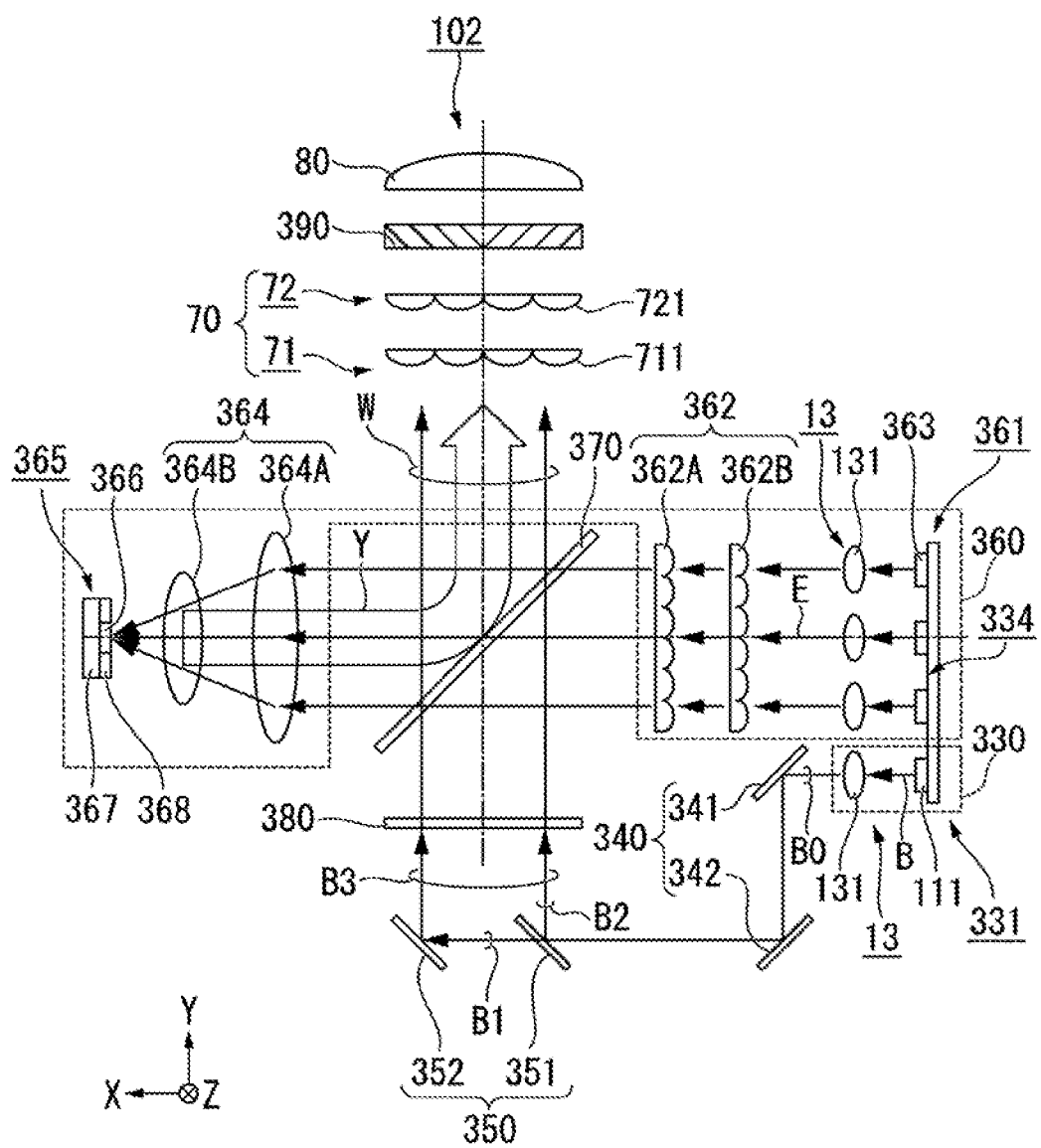

[Fig. 12]
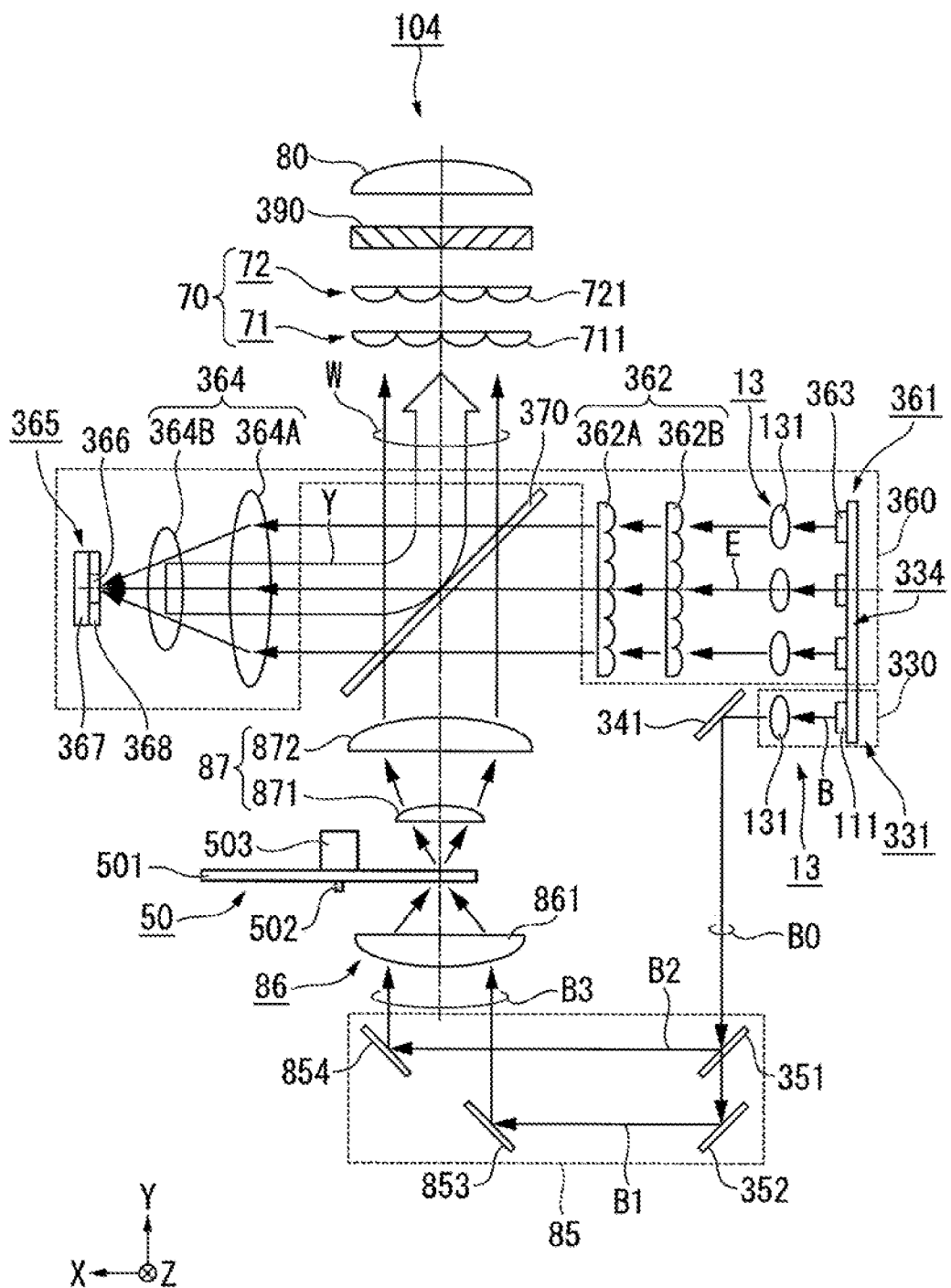

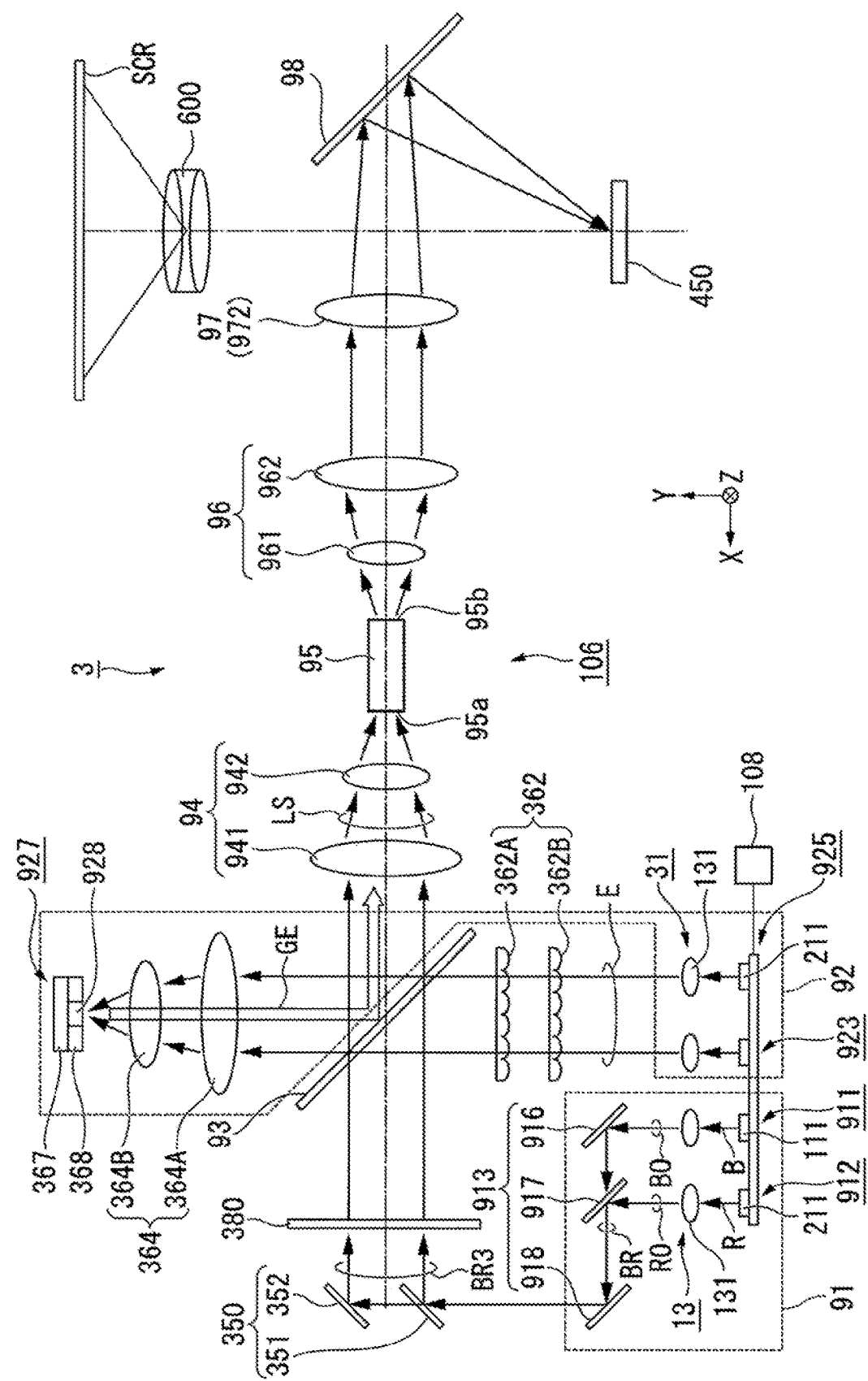
[Fig. 13]

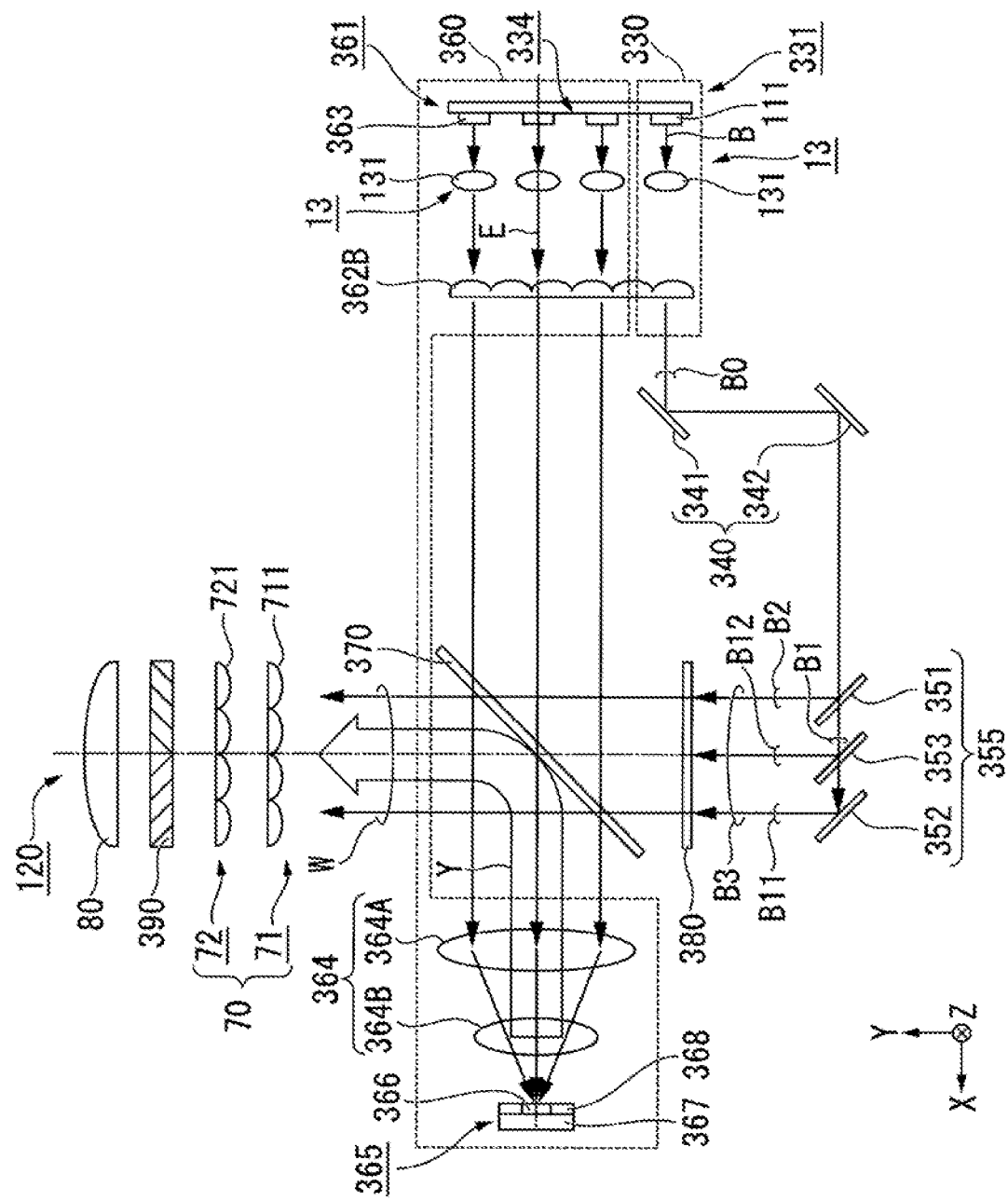

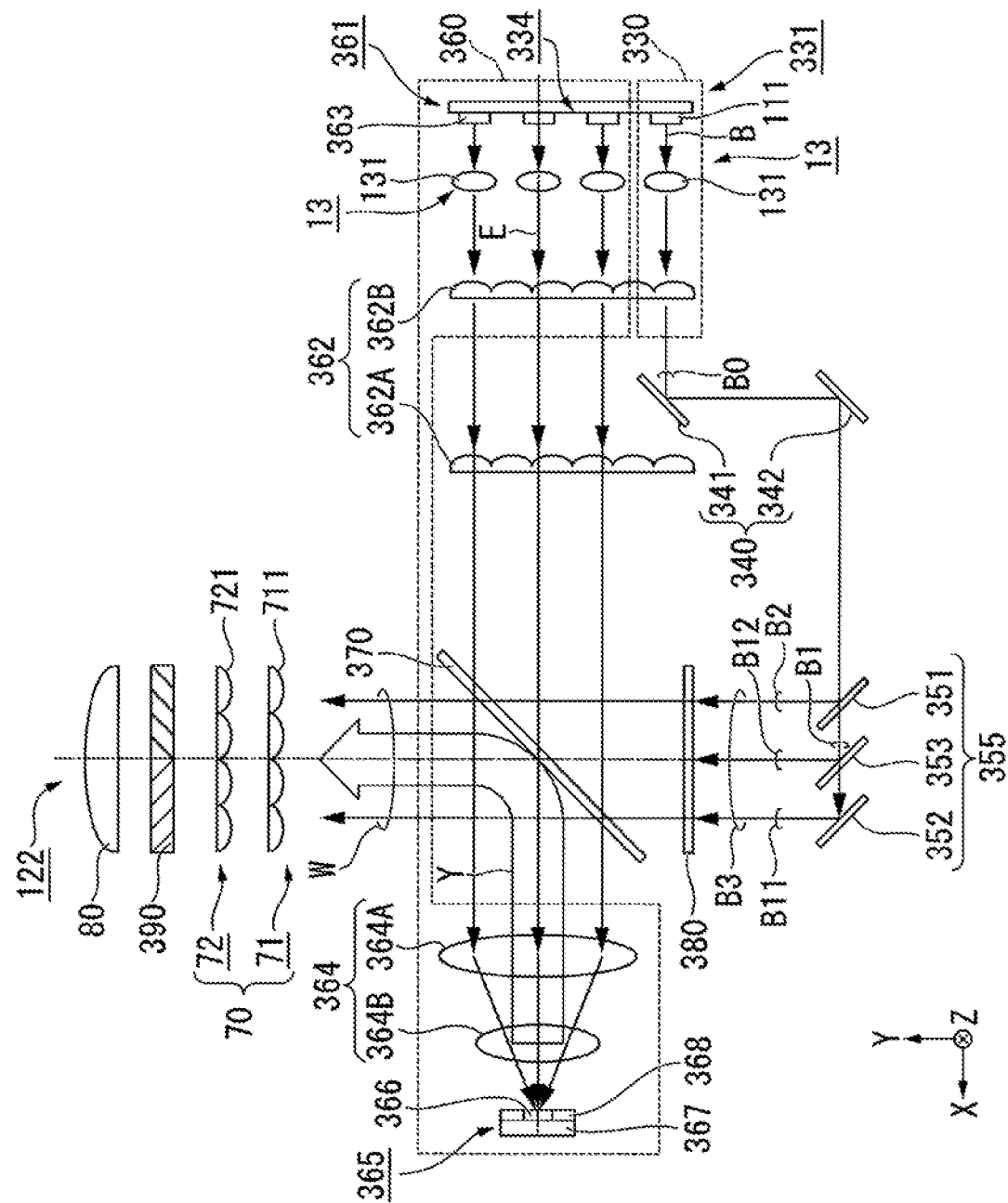
[Fig. 15]

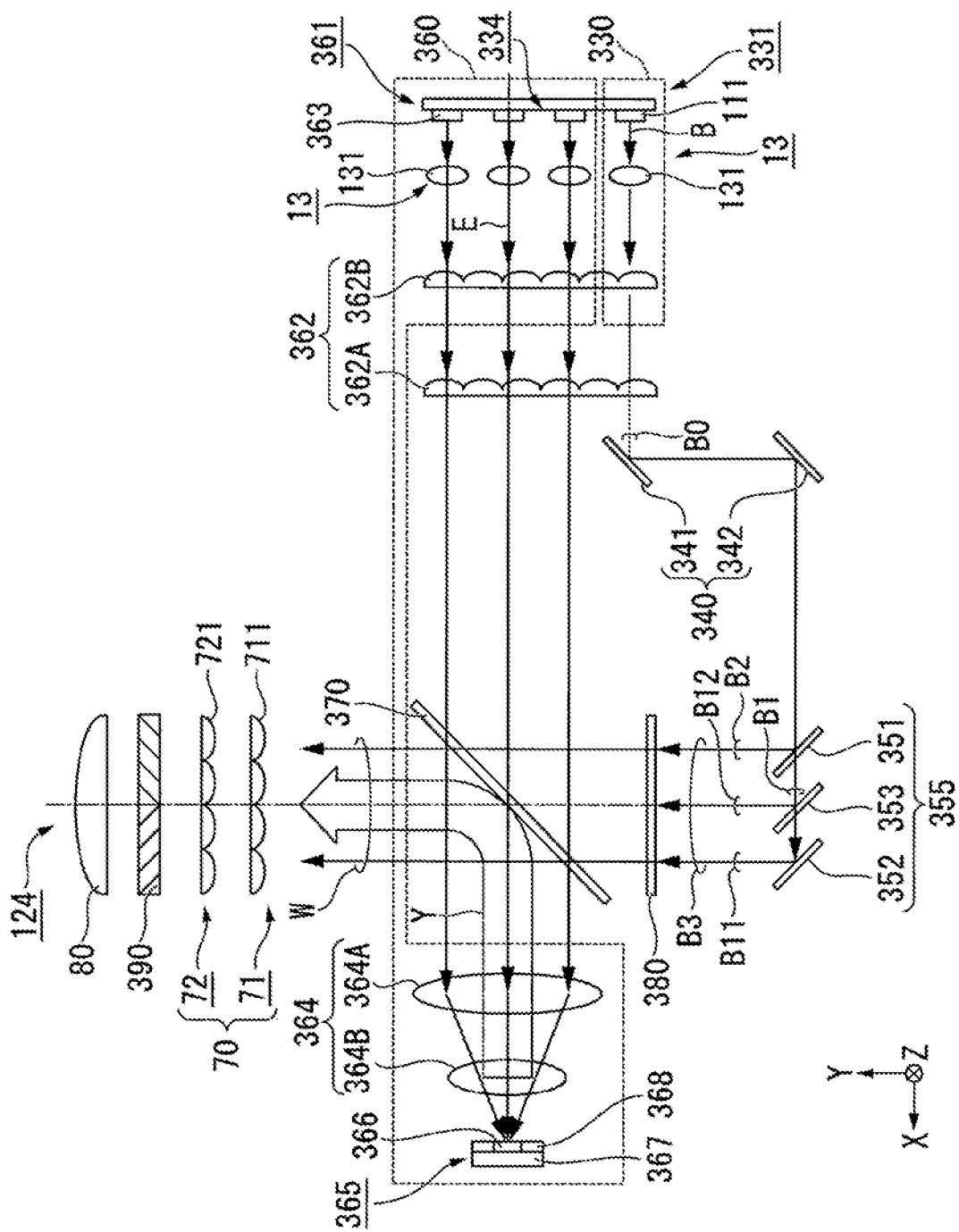
[Fig. 16]

ILLUMINATOR AND PROJECTOR

BACKGROUND

1. Technical Field

The present invention relates to an illuminator and a projector.

2. Related Art

An illuminator using a laser device and a phosphor has been proposed, for example, as an illuminator used in a projector. JP A 2013-65414 described below discloses a projection apparatus including an illumination system including a blue laser light source, a red laser light source, and a green phosphor, liquid crystal panels that modulate blue light, red light, and green light from the illumination system, and a projection system.

In the projection apparatus, the blue light from the blue laser light source branches off at a half-silvered mirror, with one of the branched blue light fluxes being incident on the liquid crystal panel for blue light and the other being incident as excitation light on the green phosphor. Green fluorescence produced by the green phosphor is incident on the liquid crystal panel for green light. The red light from the red laser light source is incident on the liquid crystal panel for red light.

In the projection apparatus disclosed in JP-A-2013-65414, the green light in the form of fluorescence has a Lambertian light orientation distribution and is thicker than the red and blue light in the form of laser light. Further, in general, a blue laser device and a red laser device differ from each other in terms of output power, and it is therefore necessary to differentiate the numbers of laser devices to be used from each other to balance the amounts of light from the laser devices with the each other. The red light and the blue light therefore differ from each other in terms of light flux thickness. Collecting the color light fluxes having different thicknesses and irradiating a display panel with the color light fluxes to project an image causes a problem of color unevenness in the image.

SUMMARY

An aspect of the invention has been attained to solve the problem described above, and an object of the aspect of the invention is to provide an illuminator capable of reducing the color unevenness. An object of another aspect of the invention is to provide a projector including the illuminator.

To achieve the object described above, an illuminator according to an aspect of the invention includes a first light source unit that includes a first light source region outputting parallelized first color light and outputs first light containing the first color light, a second light source unit that outputs parallelized second light formed of second color light having a color different from a color of the first color light and thicker than the first light, and a light ray flux adjusting system provided in an optical path of the first light. The light ray flux adjusting system has a function of increasing a thickness of the first light in such a way that a different in thickness between the first light and the second light on a downstream of the light ray flux adjusting system is smaller than a different in thickness between the first light and the second light on an upstream of the light ray flux adjusting system.

The illuminator according to the aspect of the invention reduces color unevenness as compared with a case where no light ray flux adjusting system is provided.

In the illuminator according to the aspect of the invention, the light ray flux adjusting system may include a first reflector that transmits a first component of the first light and reflects a second component of the first light and a second reflector that reflects the first component having passed through the first reflector.

According to the configuration described above, changing the distance between the first reflector and the second reflector allows adjustment of the thickness of the first light.

The illuminator according to the aspect of the invention may further include a first light ray combining system having a function of combining the second light and the first light having passed through the light ray flux adjusting system and a diffuser provided in the optical path of the first light between the light ray flux adjusting system and the first light ray combining system.

According to the configuration described above, the second light and the first light having passed through the light ray flux adjusting system exit in the same direction out of the first light ray combining system. Since the first light having a thickness increased by the light ray flux adjusting system is incident on the diffuser, a low-diffusion-capability diffuser can be used as compared with a case where the first light that remains narrow is incident on the diffuser.

In the illuminator according to the aspect of the invention, the first light source unit may further include a second light source region that outputs parallelized third color light having a color different from the colors of the first color light and the second color light and a second light ray combining system having a function of combining the first color light and the third color light, and the first light source unit may output the first light containing at least one of the first color light and the third color light.

According to the configuration described above, the first color light and the third color light exit in the same direction out of the second light ray combining system. The light ray flux adjusting system therefore adjusts the thickness of the first light containing at least one of the first color light and the third color light.

The illuminator according to the aspect of the invention may further include a light source controller, the second light source unit may include a third light source region that outputs fourth color light and a wavelength converter that converts the fourth color light into the second color light, and the light source controller may be configured to control the first light source region, the second light source region, and the third light source region to output light independently from one another.

According to the configuration described above, the illuminator can output the first color light, the second color light, and the third color light in a time division manner. Further, the color balance of illumination light outputted from the illuminator can be adjusted.

In the illuminator according to the aspect of the invention, the first color light and the fourth color light may belong to a blue region, the second color light may belong to a green region, and the third color light may belong to a red region.

The configuration described above can provide an illuminator usable in a display apparatus capable of full-color display and other apparatuses. Further, white light can be produced.

In the illuminator according to the aspect of the invention, a peak wavelength of the fourth color light may be shorter than a peak wavelength of the first color light.

According to the configuration described above, in a case where the first color light is, for example, caused to be incident on a light modulator of a display apparatus and used as light for display purposes, the wavelength of excitation light that excites the wavelength converter, that is, the wavelength of the fourth color light can be selected independently of the wavelength of the light for display purposes and in accordance with the characteristics of the wavelength converter.

In the illuminator according to the aspect of the invention, the light ray flux adjusting system may include an afocal system.

According to the configuration described above, the thickness of the first light can be readily increased.

In the illuminator according to the aspect of the invention, the light ray flux adjusting system may include a first reflector that transmits a first component of the first light and reflects a second component of the first light and a second reflector that reflects the second component reflected off the first reflector.

According to the configuration described above, changing the distance between the first reflector and the second reflector allows adjustment of the thickness of the first light.

In the illuminator according to the aspect of the invention, the first light source region may include a laser device, and a lengthwise direction of a light exiting region of the laser device may be parallel to a direction in which the first reflector reflects the second component.

In the case where the first light source region includes a laser device, the light outputted from the laser device has an elliptical cross-sectional shape perpendicular to the optical axis of the light, and the lengthwise direction of the light exiting region corresponds to the direction of the minor axis of the ellipse. Therefore, when the lengthwise direction of the light exiting region is parallel to the direction in which the first reflector reflects the second component, the cross-sectional shape of the light ray flux containing a plurality of light fluxes perpendicular to the optical axis thereof is allowed to approach a circle as compared with a case where the directions are not parallel to each other. The color unevenness is thus likely to decrease.

The illuminator according to the aspect of the invention may further include a first light ray combining system having a function of combining the second light and the first light having passed through the light ray flux adjusting system and a diffuser on which light having exited out of the first light ray combining system is incident.

According to the configuration described above, the second light and the first light having passed through the light ray flux adjusting system exit in the same direction out of the first light ray combining system and is incident on the diffuser. The first light and the second light can therefore share one diffuser.

In the illuminator according to the aspect of the invention, the second light source unit may include a second light source region that outputs fourth color light, a wavelength converter that converts the fourth color light into the second color light, at least one lens array provided on a downstream of the first and second light source regions, and a diffuser on which light having exited out of the light ray flux adjusting system is incident, and the light ray flux adjusting system may be provided on a downstream of the at least one lens array.

According to the configuration described above, not only does the lens array homogenizes the optical intensity distribution on the wavelength converter, but the light ray flux adjusting system provided on the downstream of the at least one lens array homogenizes the optical intensity distribution on the diffuser. Speckles along with color unevenness can thus be reduced.

A projector according to another aspect of the invention includes the illuminator according to the aspect of the invention, a light modulator that modulates light from the illuminator in accordance with image information to form image light, and a projection system that projects the image light.

The projector according to the other aspect of the invention can display a color image having a small amount of color unevenness.

BRIEF DESCRIPTION OF THE DRAWINGS

FIG. 1 is a schematic configuration diagram of a projector according to a first embodiment.

FIG. 2 is a schematic configuration diagram of an illuminator according to the first embodiment.

FIG. 3 is a side view of a second light source unit viewed from the negative side of a direction X.

FIG. 4 describes the optical path of blue light in the illuminator viewed along a direction perpendicular to a direction Z.

FIG. 5 describes the optical path of the blue light in the illuminator viewed along the direction Z.

FIG. 6 is a perspective view of a semiconductor laser device.

FIG. 7 describes the optical path of red light in the illuminator viewed along the direction perpendicular to the direction Z.

FIG. 8 describes the optical path of green light in the illuminator viewed along the direction perpendicular to the direction Z.

FIG. 9 describes the optical path of the blue light in an illuminator according to Comparative Example viewed along the direction perpendicular to the direction Z.

FIG. 10 describes the optical path of the blue light in the illuminator according to Comparative Example viewed along the direction Z.

FIG. 11 is a schematic configuration diagram of an illuminator according to a second embodiment.

FIG. 12 is a schematic configuration diagram of an illuminator according to a variation of the second embodiment.

FIG. 13 is a schematic configuration diagram of a projector according to a third embodiment.

FIG. 14 is a schematic configuration diagram of an illuminator according to a fourth embodiment.

FIG. 15 is a schematic configuration diagram of an illuminator according to a fifth embodiment.

FIG. 16 is a schematic configuration diagram of an illuminator according to a sixth embodiment.

DESCRIPTION OF EXEMPLARY EMBODIMENTS

First Embodiment

A first embodiment of the invention will be described below with reference to FIGS. 1 to 9.

A projector according to the present embodiment is an example of a liquid crystal projector including a light source apparatus using a semiconductor laser.

In the following drawings, components are drawn at different dimensional scales in some cases for clarity of each of the components.

A projector 1 according to the present embodiment is a projection-type image display apparatus that displays a color image on a screen SCR. The projector 1 uses three light modulators corresponding to color light fluxes, red light LR, green light LG, and blue light LB. The projector 1 uses a semiconductor laser, which produces high-luminance, high-power light, as a light emitting device of the light source apparatus.

FIG. 1 is a schematic configuration diagram of the projector 1 according to the present embodiment.

The projector 1 includes an illuminator 100, a color separation/light guide system 200, a light modulator for red light 400R, a light modulator for green light 400G, a light modulator for blue light 400B, a cross dichroic prism 500, and a projection system 600, as shown in FIG. 1.

In the present embodiment, the illuminator 100 outputs white illumination light WL containing the red light LR, the green light LG, and the blue light LB.

The color separation/light guide system 200 includes a dichroic mirror 210, a dichroic mirror 220, a reflection mirror 230, a reflection mirror 240, a reflection mirror 250, a relay lens 260, and a relay lens 270. The color separation/light guide system 200 separates the illumination light WL from the illuminator 100 into the red light LR, the green light LG, and the blue light LB and guides the red light LR, the green light LG, and the blue light LB to the corresponding light modulator for red light 400R, light modulator for green light 400G, and light modulator for blue light 400B, respectively.

Field lenses 300R, 300G, and 300B are disposed between the color separation/light guide system 200 and the light modulator for red light 400R, the light modulator for green light 400G, and the light modulator for blue light 400B, respectively.

The dichroic mirror 210 transmits a red light component and reflects a green light component and a blue light component. The dichroic mirror 220 reflects the green light component and transmits the blue light component. The reflection mirror 230 reflects the red light component. The reflection mirrors 240 and 250 reflect the blue light component.

The light modulator for red light 400R, the light modulator for green light 400G, and the light modulator for blue light 400B are each formed of a liquid crystal panel that modulates the color light incident thereon in accordance with image information to form an image.

Although not shown, light-incident-side polarizers are disposed between the field lens 300R and the light modulator for red light 400R, between the field lens 300G and the light modulator for green light 400G, and between the field lens 300B and the light modulator for blue light 400B, respectively. Light-exiting-side polarizers are disposed between the light modulator for red light 400R, the light modulator for green light 400G, and the light modulator for blue light 400B and the cross dichroic prism 500.

The cross dichroic prism 500 combines image light fluxes outputted from the light modulator for red light 400R, the light modulator for green light 400G, and the light modulator for blue light 400B with one another to form a color image. The cross dichroic prism 500 is formed by bonding four right-angled prisms to each other and therefore has a substantially square shape in a plan view, and dielectric multilayer films are provided along the substantially X-letter-shaped interfaces between the bonded right-angled prisms.

The color image having exited out of the cross dichroic prism 500 is enlarged and projected by the projection apparatus 600 on the screen SCR.

FIG. 2 is a schematic configuration diagram of the illuminator 100. FIG. 3 is a side view of a second light source unit 20 viewed toward the positive side of the direction X.

Coordinate axes are defined as follows: A direction Y is the direction in which the illumination light WL is outputted from the illuminator 100; a direction X is the direction in which red light R is outputted from the second light source unit 20; and a direction Z is the direction perpendicular to the directions X and Y and oriented from the near side of the plane of view toward the far side thereof with respect to the reader of the specification.

The illuminator 100 includes a first light source unit 10, a light ray flux adjusting system 15, the second light source unit 20, a first light ray combining system 25, a third light source unit 30, a light ray combiner 35, a light collection system 40, a diffuser 50, a pickup system 60, an optical integration system 70, and a superimposing lens 80, as shown in FIG. 2.

The illuminator 100 according to the present embodiment corresponds to the illuminator in the claims. The first light source unit 10 in the present embodiment corresponds to the first light source unit in the claims. The light ray flux adjusting system 15 in the present embodiment corresponds to the light ray flux adjusting system in the claims. The second light source unit 20 in the present embodiment corresponds to the second light source unit in the claims. The first light ray combining system 25 in the present embodiment corresponds to the first light ray combining system in the claims. The diffuser 50 in the present embodiment corresponds to the diffuser in the claims.

The first light source unit 10, the light ray flux adjusting system 15, and the first light ray combining system 25 are provided along an optical axis AX1. The second light source unit 20, the first light ray combining system 25 and the light ray combiner 35 are provided along an optical axis AX2, which is perpendicular to the optical axis AX1. The third light source unit 30, the light ray combiner 35, the light collection system 40, the diffuser 50, the pickup system 60, the optical integration system 70, and the superimposing lens 80 are provided along an optical axis AX3, which is perpendicular to the optical axis AX2.

The first light source unit 10 includes a first light source region 11 and a collimation system 13. The first light source region 11 includes one first semiconductor laser device 111. The first semiconductor laser device 111 outputs blue light B having a peak wavelength ranging, for example, from 460 to 480 nm.

The collimation system 13 substantially parallelizes the blue light B outputted from the first semiconductor laser device 111. The collimation system 13 is formed of a convex lens 131. The thus configured first light source unit 10 outputs parallelized blue light B0.

The blue light B0 in the present embodiment corresponds to the first color light and first light in the claims.

The light ray flux adjusting system 15 includes an afocal system 16 and a light ray width enlarging system 17. The light ray flux adjusting system 15 increases the thickness of the blue light B0 outputted from the first light source unit 10, as will be described below.

The afocal system 16 enlarges the diameter of the blue light B0 outputted from the first light source unit 10. The afocal system 16 includes a concave lens 161 and a convex lens 162. The afocal system 16 in the present embodiment corresponds to the afocal system in the claims.

The light ray width enlarging system 17 includes a first reflector 171 (see FIG. 4), which transmits a first component B1 of the blue light B0 and reflects a second component B2 of the blue light B0, and a second reflector 172 (see FIG. 4), which reflects the second component B2 reflected off the first reflector 171. The first reflector 171 and the second reflector 172 are so disposed as to incline by 45° with respect to the directions Y and Z.

In the present specification, the first component B1 and the second component B2 are not meant to be two components of light and having wavelength different from each other but are meant to be one part of light and the other part of the light. That is, the first reflector 171 is formed of a half-silvered mirror in the present embodiment. It is, however, noted that the first reflector 171 may instead be a polarization separator. The second reflector 172 is formed of a total reflection mirror that reflects the second component B2 reflected off the first reflector 171.

FIG. 4 describes the optical path of the blue light B0 in the illuminator 100 viewed along the direction X. In FIG. 4, the first light ray combining system 25 and the light ray combiner 35 disposed in the optical path of the blue light B0 are omitted, and the deflected optical path of the blue light B0 as shown in FIG. 2 is so redrawn as to be a straight optical path for ease of understanding of the description.

The blue light B0 passes through the afocal system 16 and is converted by the afocal system 16 into thick blue light B0', which is then caused by the light ray width enlarging system 17 to branch into the first component B1 and the second component B2, as shown in FIG. 4. The first component B1 passes through the first reflector 171 and travels toward the negative side of the direction Y. The second component B2 is reflected off the first reflector 171, travels toward the positive side of the direction Z, is further reflected off the second reflector 172, and travels toward the negative side of the direction Y. The light ray flux adjusting system 15 thus causes the blue light B to branch into the first component B1 and the second component B2, which travel in directions parallel to each other. Blue light B3 on the downstream of the light ray flux adjusting system 15 is thus thicker than the blue light B0 on the upstream of the light ray flux adjusting system.

In the present specification, in a case where light is formed of a plurality of light beams, the thickness of the light is defined as the area of a figure that circumscribes the outermost light beam when viewed along the optical axis of the light. In a case where light is formed of a single light beam, the thickness of the light is defined as the cross-sectional area of the light perpendicular to the optical axis thereof. The above description therefore shows that the area of the figure that circumscribes the two light beams (first component B1 and second component B2) that form the blue light B3 on the downstream of the light ray flux adjusting system 15 is greater than the cross-sectional area of the blue light B0 on the upstream of the light ray flux adjusting system 15. The figure described above is, for example, a circle.

The second light source unit 20 includes a second light source region 21 and a collimation system 22. The second light source region 21 is formed of seven second semiconductor laser devices 211, as shown in FIG. 3. The second semiconductor laser devices 211 each output red light R having a peak wavelength ranging, for example, from 610 nm to 680 nm. The second light source unit 20 outputs red light R0 formed of seven beams of the red light R having a color different from the color of the blue light B (first color light).

The collimation system 22 substantially parallelizes the red light R outputted from each of the second semiconductor laser devices 211. The collimation system 22 is formed of convex lenses 221 provided in correspondence with the plurality of second semiconductor laser devices 211. Therefore, the red light R0 is parallelized and thicker than the blue light B0.

The red light R0 in the present embodiment corresponds to the second color light and the second light in the claims.

FIG. 3 is a side view of the second light source unit 20 viewed toward the positive side of direction X.

The seven second semiconductor laser devices 211 have a configuration in which two second semiconductor laser devices 211 are juxtaposed in the direction Y on the upper side in the direction Z, three second semiconductor laser devices 211 are juxtaposed in the direction Y in the middle in the direction Z, and two second semiconductor laser devices 211 are juxtaposed in the direction Y on the lower side in the direction Z, as shown in FIG. 3. For example, in a case where the second semiconductor laser devices 211 are each formed of a CAN-packaged semiconductor laser, the arrangement described above allows the seven second semiconductor laser devices 211 to be arranged in a dense manner, whereby the size of the second light source unit 20 can be reduced. The same holds true for the third light source unit 30.

The first light ray combining system 25 has the function of combining the red light R0 and the blue light B3 having passed through the light ray flux adjusting system 15 with each other to produce light BR, as shown in FIG. 2. The first light ray combining system 25 is formed of a dichroic mirror that transmits the red light R0 and reflects the blue light B3. The dichroic mirror is so disposed as to incline by 45° with respect to the directions X and Y.

The third light source unit 30 includes a third light source region 31 and a collimation system 32. The third light source region 31 is formed of seven third semiconductor laser devices 311. The third semiconductor laser devices 311 each output green light G having a peak wavelength ranging, for example, from 500 nm to 590 nm. The third light source unit 30 outputs green light G0 formed of seven beams of the green light G having a color different from the color of the blue light B.

The collimation system 32 substantially parallelizes the green light G outputted from each of the third semiconductor laser devices 311. The collimation system 32 is formed of convex lenses 321 provided in correspondence with the plurality of third semiconductor laser devices 311. Therefore, the green light G0 is parallelized and thicker than the blue light B0.

The light ray combiner 35 has the function of combining the green light G0 and the light BR. The light ray combiner 35 is formed of a dichroic mirror that transmits the green light G0 and reflects the light BR. The dichroic mirror is so disposed as to incline by 45° with respect to the directions X and Y. The light ray combiner 35 therefore outputs white light W, which is the combination of the blue light B3, the green light G0, and the red light R0.

The light collection system 40 collects the white light W having exited out of the light ray combiner 35 and causes the collected white light W to be incident on the diffuser 50. The light collection system 40 is formed of a convex lens 401.

The diffuser 50 includes a diffusing plate 501 and a motor 503, which rotates the diffusing plate 501 around a rotary shaft 502. The diffuser 50 diffuses the white light W incident on the diffusing plate 501.

The pickup system 60 substantially parallelizes the white light W having exited out of the diffuser 50. The pickup system 60 is formed of a convex lens 601.

The optical integration system 70 includes a first lens array 71 and a second lens array 72. The first lens array includes a plurality of lenses 711, which divide the white light W having exited out of the pickup system 60 into a plurality of sub-light ray fluxes. The plurality of lenses 711 are arranged in a matrix in a plane perpendicular to the optical axis AX3.

The second lens array 72 includes a plurality of lenses 721 corresponding to the plurality of lenses 711 of the first lens array 71. The second lens array 72, along with the superimposing lens 80, forms images of the lenses 711 of the first lens array 71 in the vicinity of an image formation region of each of the light modulator 400R for red light, the light modulator 400G for green light, and the light modulator 400B for blue light. The plurality of lenses 712 are arranged in a matrix in a plane perpendicular to the optical axis AX3.

FIG. 6 is a perspective view of the first semiconductor laser device 111.

The first semiconductor laser device 111 has a light exiting region 111a, from which the blue light B exits, as shown in FIG. 6. The shape of the light exiting region 111a in the plan view is a substantially rectangular shape having a lengthwise direction W1 and the widthwise direction W2 when viewed along a chief ray Bc of the blue light B. The second semiconductor laser devices 211 and third semiconductor laser devices 311 also each have the same shape as that of the first semiconductor laser device 111.

In the first semiconductor laser device 111, the lengthwise direction W1 of the light exiting region 111a coincides with the direction Z, and the widthwise direction W2 of the light exiting region 111a coincides with the direction X, which intersects the direction Z.

The blue light B outputted from the first semiconductor laser device 111 is linearly polarized light having a polarization direction parallel to the lengthwise direction W1. A divergence angel θ2 of the blue light B in the widthwise direction W2 is greater than a divergence angel θ1 of the blue light B in the lengthwise direction W1. A cross-sectional shape BS of the blue light B perpendicular to the optical axis thereof is therefore an elliptical shape having a major axis direction that coincides with the direction X and a minor axis direction that coincides with the direction Z.

When the illuminator 100 is viewed along the direction perpendicular to the plane YZ, the divergence angle θ1 of the blue light B outputted from the first semiconductor laser device 111 is relatively small, as shown in FIG. 4. After the blue light B passes through the afocal system 16 and is converted by the afocal system 16 into the thick blue light B0', the light ray flux adjusting system 15 caused the blue light B to branch into the first component B1 and the second component B2. The lengthwise direction W1 of the light exiting region 111a of the first semiconductor laser device 111 is parallel to the direction in which the first reflector 171 of the light ray flux adjusting system 15 reflects the second component B2. The thick blue light B3, which is the result of the division of the blue light B0' into the two components B1 and B2, enters the light collection system 40.

FIG. 5 describes the optical path of the blue light B0 in the illuminator 100 viewed along the direction Z. In FIG. 5, the first light ray combining system 25 and the light ray combiner 35 disposed in the optical path of the blue light B0 are omitted, and the deflected optical path of the blue light B0 as shown in FIG. 2 is so redrawn as to be a straight optical path for ease of understanding of the description.

When the illuminator 100 is viewed along the direction Z, the divergence angle θ2 of the blue light B outputted from the first semiconductor laser device 111 is greater than the divergence angle θ1 shown in FIG. 4, as shown in FIG. 5.

FIG. 7 describes the optical path of the red light R in the illuminator 100 viewed along the direction X. In FIG. 7, the first light ray combining system 25 and the light ray combiner 35 disposed in the optical path of the red light R are omitted, and the deflected optical path of the red light R as shown in FIG. 2 is so redrawn as to be a straight optical path for ease of understanding of the description.

FIG. 8 describes the optical path of the green light G in the illuminator 100 viewed along the direction X. In FIG. 8, the light ray combiner 35 disposed in the optical path of the green light G is omitted for ease of understanding of the description.

When the illuminator 100 is viewed along the direction X, a divergence angle θ3 of the red light R outputted from each of the second semiconductor laser devices 211 is comparable to the divergence angle θ1 of the blue light B, as shown in FIG. 7. FIG. 7 shows only three red light fluxes R, but seven red light fluxes R actually enter the light collection system. The same situation of the red light R holds true for the green light G, as shown in FIG. 8.

In general, a semiconductor laser device for blue light outputs light having power sufficiently greater than the power of the light outputted from a semiconductor laser device for green light and a semiconductor laser device for red light. Therefore, to adjust the white balance of white light formed of the color light fluxes, the number of semiconductor laser devices for green light and the number of semiconductor laser devices for red light need to be greater than the number of semiconductor laser devices for blue light.

Therefore, in the present embodiment, the first light source unit 10 includes one first semiconductor laser device 111, whereas the second light source unit 20 includes seven second semiconductor laser devices 211, and the third light source unit 30 includes seven third semiconductor laser devices 311. As a result, comparison of the light flux thicknesses from the three light source units on the upstream of the light ray flux adjusting system shows that the second light (red light R0) outputted from the second light source unit 20 and formed of the seven beams of the red light R and the green light G0 outputted from the third light source unit 30 and formed of the seven beams of the green light G are thicker than the first light (blue light B0) outputted from the first light source unit 10 and formed of the one beam of the blue light B.

An illuminator 900 according to Comparative Example, which is the illuminator 100 according to the present embodiment from which the light ray flux adjusting system 15 is removed, will now be described.

FIG. 9 describes the optical path of the blue light B0 in the illuminator 900 according to Comparative Example viewed along the direction perpendicular to the plane YZ. FIG. 10 describes the optical path of the blue light B0 in the illuminator 900 according to Comparative Example viewed along the direction Z.

In the illuminator 900 according to Comparative Example, the thickness of the blue light B0 is not increased by the light ray flux adjusting system 15, and the narrow blue light B0 enters the light collection system 40, as shown in FIGS. 9 and 10. The thicker the blue light B0 before incidence on the light collection system 40, the wider the distribution range of the angle of incidence of the blue light B0 incident on the diffuser 50.

As for the red light R0 and the green light G0, the illuminator 900 according to Comparative Example has the same configuration as that of the illuminator 100 according to the present embodiment. The red light R0 and the green light G0 that are thicker than the blue light B0 therefore enter the light collection system 40, which collects the red light R0 and the green light G0, and the collected red light R0 and green light G0 are incident on the diffuser 50, as shown in FIGS. 7 and 8. Distribution ranges α5 and α6 of the angles of incidence of the red light R0 and the green light G0 incident on the diffuser 50 are therefore greater than distribution ranges α3 and α4 of the angles of incidence of the blue light B0 incident on the diffuser 50. In the configuration of the present embodiment, in which all the color light fluxes enter the common light collection system 40, diffusion angles β5 and β6 of the red light R0 and the green light G0 exiting out of the diffuser 50 are greater than diffusion angles β3 and β4 of the blue light B3 exiting out of the diffuser 50 because the diffusion angles reflect the distribution ranges of the angles of incidence.

As described above, the illuminator 900 according to Comparative Example, in which the plurality of color light fluxes having different diffusion angles enter a downstream optical system, such as an optical integration system, causes color unevenness.

In contrast, since the illuminator 100 according to the present embodiment includes the light ray flux adjusting system 15, the blue light B3 on the downstream of the light ray flux adjusting system 15 is thicker than the blue light B0 on the upstream of the light ray flux adjusting system 15, as shown in FIG. 4. The difference in thickness between the blue light B3 and the red light R0 on the downstream of the light ray flux adjusting system 15 is smaller than the difference in thickness between the blue light B0 and the red light R0 on the upstream of the light ray flux adjusting system 15.

Further, adjusting as appropriate the distance between the first reflector 171 and the second reflector 172 of the light ray flux adjusting system 15 allows the thickness of the blue light B3 to be substantially equal to the thickness of the red light R0 on the downstream of the light ray flux adjusting system 15. The relationship between the blue light B3 and the red light R0 has been described above, and the same holds true for the relationship between the blue light B3 and the green light G0.

In this case, since the distribution ranges of the angles of incidence of the color light fluxes incident on the diffuser 50 are substantially equal to one another, the diffusion angles of the color light fluxes exiting out of the diffuser 50 are also roughly equal to one another. As described above, the illuminator 100 according to the present embodiment, in which the plurality of color light fluxes having substantially the same diffusion angles enter a downstream optical system, such as the optical integration system 70, allows reduction in color unevenness.

In the illuminator 900 according to Comparative Example, which includes no light ray flux adjusting system 15, to reduce the difference in diffusion angle among the plurality of color light fluxes, it is necessary to provide a separate diffuser for blue light having stronger diffusion power than that of the diffuser for red light or green light. In this case, an increase in the number of parts, an increase in the size of the illuminator, and other problems occur. In contrast, the illuminator 100 according to the present embodiment, in which all the color light fluxes can share one diffuser 50, does not cause the problems described above.

Further, the present embodiment, in which the light ray flux adjusting system 15 includes the afocal system 16 and the afocal system 16 can increase the thickness of the blue light B0, is likely to achieve a configuration in which the difference in thickness between the blue light B3 and the red light R0 on the downstream of the light ray flux adjusting system 15 is smaller than the difference in thickness between the blue light B0 and the red light R0 on the upstream of the light ray flux adjusting system 15.

The order in which the afocal system 16 and the light ray width enlarging system 17 are arranged in the present embodiment may be reversed, that is, the light ray width enlarging system 17 may be disposed on the upstream of the afocal system 16. It is, however, noted that the arrangement in which the afocal system 16 is disposed on the upstream of the light ray width enlarging system 17, which is the case in the present embodiment, allows reduction in size of the afocal system 16.

In the present embodiment, the lengthwise direction W1 of the light exiting region 111a of the first semiconductor laser device 111 is parallel to the direction in which the first reflector 171 reflects the second component B2 (that is, direction in which second component B2 branches off first component B1). The cross-sectional shape of the light containing the two components B1 and B2 perpendicular to the optical axis thereof is therefore allowed to approach a circle as compared with a case where the directions are not parallel to each other. The color unevenness is thus likely to decrease.

Second Embodiment

A second embodiment of the invention will be described below with reference to FIG. 11.

The basic configuration of a projector according to the second embodiment is the same as that in the first embodiment, and the second embodiment differs from the first embodiment in terms of the configuration of the illuminator. Therefore, the entire projector will not be described, and only the illuminator will be described.

FIG. 11 is a schematic configuration diagram of an illuminator 102 according to the second embodiment.

In FIG. 11, the same components as those in the drawings used in the first embodiment have the same reference characters and will not be described.

The illuminator 102 according to the present embodiment includes a first light source unit 330, an optical path changing system 340, a light ray flux adjusting system 350, a second light source unit 360, a first light ray combining system 370, a diffuser 380, the optical integration system 70, a polarization converter 390, and the superimposing lens 80, as shown in FIG. 11.

The first light source unit 330 includes a first light source region 331 and the collimation system 13. The first light source regions 331 is formed of a plurality of first semiconductor laser devices 111, which each output the blue light B having the peak wavelength ranging, for example, from 460 to 480 nm. FIG. 11 shows one first semiconductor laser device 111, and a plurality of first semiconductor laser devices 111 are actually arranged in the direction perpendicular to the plane of view.

The collimation system 13 is formed of convex lenses 131, which each substantially parallelize the blue light B. The plurality of blue light beams B outputted from the first light source region 331 and parallelized by the collimation system 13 form the blue light B0. The blue light B0 corresponds to the first color light and first light in the claims.

The second light source unit 360 includes a second light source region 361, the collimation system 13, a homogenizer system 362, a collimation/light collection system 364, and a wavelength converter 365. The second light source regions 361 is formed of a plurality of second semiconductor laser devices 363, which each output excitation light E having a peak wavelength ranging, for example, from 440 to 460 nm.

The collimation system 13 substantially parallelizes the excitation light E outputted from each of the second semiconductor laser devices 363. The collimation system 13 is formed of convex lenses 131 provided in correspondence with the plurality of second semiconductor laser devices 363.

The homogenizer system 362 converts the optical intensity distribution in an illumination receiving region (phosphor layer 366 of wavelength converter 365) illuminated with the excitation light E having exited out of the collimation system into a uniform optical intensity distribution. The homogenizer system 362 is formed, for example, of a pair of lens arrays 362A and 362B.

The collimation/light collection system 364 has the function of causing the excitation light E having passed through the first light ray combining system 370 and having been substantially collected to enter the phosphor layer 366 and the function of substantially parallelizing fluorescence Y emitted from the phosphor layer 366. The collimation/light collection system 364 includes a first convex lens 364A and a second convex lens 364B.

The wavelength converter 365 converts the excitation light E into the fluorescence Y. The wavelength converter 365 includes the phosphor layer 366, a substrate 367, which supports the phosphor layer 366, and a fixing member 368, which fixes the phosphor layer 366 to the substrate 367.

The phosphor layer 366 contains a phosphor material that absorbs the excitation light E having the wavelength ranging, for example, from 440 to 460 nm and is excited therewith. The phosphor excited with the excitation light E produces the fluorescence Y, which is yellow fluorescence and having a peak wavelength that belongs to a wavelength band ranging, for example, from 500 to 700 nm. The phosphor layer 366 contains a base agent formed of an inorganic material and an activator agent that serves as light emission centers dispersed in the base agent. The phosphor layer 366 is formed, for example, of a YAG-based phosphor made of $(Y,Gd)_3(Al,Ga)_5O_{12}$(YAG:Ce) with Ce serving as the activator agent.

The peak wavelength of the second semiconductor laser devices 363 is desirably shorter than the peak wavelength of the first semiconductor laser devices 111 to cause the YAG-based phosphor to efficiently produce the fluorescence Y.

The plurality of first semiconductor laser devices 111 and the plurality of second semiconductor laser device 363 form a light source array 334. The plurality of first semiconductor laser devices 111 are arranged in one row, and the plurality of second semiconductor laser device 363 are arranged in three rows.

The optical path changing system 340 includes a branch mirror 341 and a reflection mirror 342. The branch mirror 341 and the reflection mirror 342 are so disposed as to incline by 45° with respect to each of the directions X and Y. The branch mirror 341 reflects the blue light B0 out of the light from the light source array 334 to cause the blue light B0 to branch off the excitation light E. The blue light B0 traveling toward the positive side of the direction X is reflected off the branch mirror 341, travels toward the negative side of the direction Y, is further reflected off the reflection mirror 342, and travels toward the positive side of the direction X.

The light ray flux adjusting system 350 includes a first reflector 351, which transmits the first component B1 of the blue light B0 and reflects the second component B2 of the blue light B0, and a second reflector 352, which reflects the first component B1 having passed through the first reflector 351. The first reflector 351 and the second reflector 352 are so disposed as to incline by 45° with respect to the directions X and Y. The first reflector 351 is formed of a half-silvered mirror.

The first component B1 is reflected off the second reflector 352 and travels toward the positive side of the direction Y. The second component B2 is reflected off the first reflector 351 and travels toward the positive side of the direction Y. The light ray flux adjusting system 350 thus causes the blue light B to branch into the two components B1 and B2, which travel in the same direction. The blue light B3 on the downstream of the light ray flux adjusting system 350 is thus thicker than the blue light B0 on the upstream of the light ray flux adjusting system 350.

The fluorescence Y having a Lambertian light orientation distribution is emitted from the phosphor layer 366. The fluorescence Y outputted from the wavelength converter 365 is parallelized by the collimation/light collection system 364. The second light source unit 360 thus outputs parallelized fluorescence Y exhibiting yellow, which differs from the color of the blue light B0 (first color light), and thicker than the blue light B0.

The fluorescence Y in the present embodiment corresponds to the second color light and the second light in the claims.

The first light ray combining system 370 has the function of combining the fluorescence Y and the blue light B3 having exited out of the light ray flux adjusting system 350 with each other. The first light ray combining system 370 is formed of a dichroic mirror that transmits light that belongs to a blue band and reflects light that belongs to a yellow band. The dichroic mirror is so disposed as to incline by 45° with respect to the directions X and Y. The fluorescence Y is therefore reflected off the first light ray combining system 370. The blue light B3 passes through the first light ray combining system 370.

The fluorescence Y and the blue light B3 are thus combined with each other by the first light ray combining system 370 into white illumination light W.

The diffuser 380 is provided in the optical path of the blue light B3 between the light ray flux adjusting system 350 and the first light ray combining system 370. The diffuser 380 is formed of a diffusing plate and diffuses the blue light B3 incident on the diffuser plate.

The polarization coveter 390 is provided in the optical path of the illumination light W between the optical integration system 70 and the superimposing lens 80. The polarization converter 390 converts each of the divided sub-light ray fluxes from the first lens array 711 into a linearly polarized light ray flux. The polarization converter 390 includes, although not shown, polarization separation layers, reflection layers, and retardation layers.

In general, the ratio between the amount of blue light and the amount of excitation light for generation of standard white light is about 20%:80%. From this point of view, in the illuminator 102 according to the present embodiment, out of the semiconductor laser devices that form the light source array 334, the first semiconductor laser devices 111 arranged in one row are assigned to produce the blue light, and the second semiconductor laser devices 363 arranged in three rows are assigned to produce the excitation light.

Since the number of rows of the first semiconductor laser devices 111 is one, the blue light B0 outputted from the first semiconductor laser devices 111 is narrower than the fluorescence Y parallelized by the collimation/light collection system 364. Combining the narrow blue light B0 and the thick fluorescence Y with each other causes color unevenness. If no light ray flux adjusting system 350 is provided, it is difficult to sufficiently increase the thickness of the blue light B0 even when the diffuser 380 diffuses the blue light B0.

In contrast, in the illuminator 102 according to the present embodiment, in which the light ray flux adjusting system 350 converts the blue light B0 into the thick blue light B3, the difference in thickness between the blue light B3 and the parallelized fluorescence Y on the downstream of the light ray flux adjusting system 350 is smaller than the difference in thickness between the blue light B0 and the parallelized fluorescence Y on the upstream of the light ray flux adjusting system 350.

Further, adjusting the distance between the first reflector 351 and the second reflector 352 of the light ray flux adjusting system 350 allows the blue light B3 and the parallelized fluorescence Y to have substantially the same thickness. As described above, in the illuminator 102 according to the present embodiment, the blue light B3 and the fluorescence Y configured to have a small thickness difference enter the downstream optical system, such as the optical integration system 70. The color unevenness can thus be reduced.

Further, if the illuminator 102 includes no light ray flux adjusting system 350, it is necessary to sufficiently increase the diffusion capability of the diffuser 380 to reduce the difference in thickness between the blue light B0 and the fluorescence Y. In this case, the problems such as the limited increase in diffusion capability and the cost increase in the diffuser occur. In contrast, the illuminator 102 according to the present embodiment, in which the thickness of the blue light B0 can be increased before the blue light B0 is incident on the diffuser 380, needs to use no diffuser having a high diffusion capability. The problem described above will therefore not occur.

Variation of Second Embodiment

A variation of the second embodiment will be described below with reference to FIG. 12.

The basic configuration of an illuminator according to the variation is the same as that in the second embodiment, and the variation differs from the second embodiment in terms of the configuration of part of the illuminator. Therefore, the entire illuminator will not be described, and only the different portion will be described.

FIG. 12 is a schematic configuration diagram of an illuminator 104 according to the variation.

In FIG. 12, the same components as those in FIG. 2 used in the first embodiment and in FIG. 11 used in the second embodiment have the same reference characters and will not be described.

In the illuminator 104 according to the variation, a light ray flux adjusting system 85 includes the first reflector 351, the second reflector 352, a third reflector 853, and a fourth reflector 854, as shown in FIG. 12.

The third reflector 853 reflects the first component B1 reflected off the second reflector 352. The fourth reflector 854 reflects the second component B2 reflected off the first reflector 351.

The light collection system 86 collects the blue light B3 having exited out of the light ray flux adjusting system 85 and causes the collected blue light B3 to be incident on the diffuser 50. The light collection system 86 is formed of a convex lens 861. The diffuser 50 is identical to the diffuser 50 in the first embodiment. The pickup system 87 substantially parallelizes the blue light B3 having exited out of the diffuser 50. The pickup system 87 is formed of a first convex lens 871 and a second convex lens 872.

Also in the illuminator 104 according to the present embodiment, which is provided with the light ray flux adjusting system 85, the difference in thickness between the blue light B3 and the parallelized fluorescence Y on the downstream of the light ray flux adjusting system 85 is smaller than the difference in thickness between the blue light B0 and the parallelized fluorescence Y on the upstream of the light ray flux adjusting system 85. The color unevenness can thus be reduced.

Third Embodiment

A third embodiment of the invention will be described below with reference to FIG. 13.

A projector according to the third embodiment includes a micromirror-type light modulator.

FIG. 13 is a schematic configuration diagram of a projector 3 according to the third embodiment.

In FIG. 13, the same components as those in FIG. 1 used in the first embodiment have the same reference characters and will not be described.

The projector 3 according to the present embodiment includes an illuminator 106, a micromirror-type light modulator 450, and the projection system 600. The illuminator 106 outputs the red light R0, green light GE, and the blue light B0 in a time division manner and causes the red light R0, the green light GE, and the blue light B0 to be sequentially incident on the micromirror-type light modulator 450.

The micromirror-type light modulator 450 is, for example, a DMD (digital micromirror device). A DMD includes a plurality of micromirrors (movable reflectors) arranged in a matrix. The DMD switches the inclination direction of the plurality of micromirrors from one direction to another to switch the direction in which light incident on the DMD is reflected between the direction in which the light enters the projection system 600 and the direction in which the light does not enter the projection system 600.

The micromirror-type light modulator 450 thus sequentially modulates the red light R0, the green light GE, and the blue light B0 outputted from the illuminator 106 to produce a red image, a green image, and a blue image. The projection system 600 projects the red image, the green image, and the blue image on the screen SCR.

The illuminator 106 includes a first light source unit 91, the light ray flux adjusting system 350, the diffuser 380, a second light source unit 92, a first light ray combining system 93, a first light collection system 94, a rod integrator 95, a pickup system 96, a second light collection system 97, a light guide system 98, and a light source controller 108.

The first light source unit 91 includes a first light source region 911, a second light source region 912, the collimation system 13, and a second light ray combining system 913. The first light source regions 911 are formed of a plurality of first semiconductor laser devices 111, which each output the blue light B having the peak wavelength ranging, for example, from 460 to 480 nm. The second light source regions 912 are formed of a plurality of second semiconductor laser devices 211, which each output the red light R having the peak wavelength ranging, for example, from 610 to 680 nm.

The plurality of first semiconductor laser devices 111, the plurality of second semiconductor laser devices 211, and a plurality of third semiconductor laser devices 921 of the second light source unit 92, which will be described later, form a light source array 923. The plurality of first semiconductor laser devices 111 are arranged in one row, the plurality of second semiconductor laser devices 211 are arranged in one row, and the plurality of third semiconductor laser devices 921 are arranged in two rows. The third semiconductor laser devices 921 each output the excitation light E having the peak wavelength ranging, for example, from 440 to 460 nm. The peak wavelength of the excitation light E is shorter than the peak wavelength of the blue light B and falls within a blue region.

The excitation light E in the present embodiment corresponds to the fourth color light in the claims.

The plurality of first semiconductor laser devices 111, the plurality of second semiconductor laser devices 211, and the plurality of third semiconductor laser devices 921 are turned on in a time division manner.

The collimation system 13 substantially parallelizes the blue light B and the red light R. The collimation system 13 is formed of the convex lenses 131 provided in correspondence with the plurality of semiconductor laser devices 111 and 211. The plurality of blue light beams B parallelized by the collimation system 13 form the blue light B0. The blue light B0 corresponds to the first color light in the claims. The plurality of red light beams R parallelized by the collimation system 13 form the red light R0. The red light R0 corresponds to the third color light in the claims.

The second light ray combining system 913 includes a branch mirror 916, a combining mirror 917, and a reflection mirror 918. The branch mirror 916, the combining mirror 917, and the reflection mirror 918 are each so disposed as to incline by 45° with respect to each of the directions X and Y.

The branch mirror 916 is formed of a total reflection mirror provided in the optical path of the blue light B0. The branch mirror 916 reflects the blue light B0 to cause the blue light B0 to branch off the excitation light E outputted from the third semiconductor laser devices 921. The blue light B0 traveling toward the positive side of the direction Y is reflected off the branch mirror 916 and travels toward the positive side of the direction X.

The combining mirror 917 is formed of a dichroic mirror provided in the optical path of the red light R0 and the optical path of the blue light B0. The combining mirror 917 transmits the blue light B0 and reflects the red light R0. That is, the combining mirror 917 has the function of combining the blue light B0 and the red light R0 with each other. The red light R0 traveling toward the positive side of the direction Y is reflected off the combining mirror 917 and travels toward the positive side of the direction X.

The light having exited out of the combining mirror 917 is referred to as first light BR. The first light source region 911 and the second light source region 912 output the blue light B0 and the red light R0 in a time division manner. That is, the first light source unit 91 outputs the first light BR containing one of the blue light B0 and the red light R0.

The reflection mirror 918 reflects the first light BR having exited out of the combining mirror 917. The first light BR traveling toward the positive side of the direction X is reflected off the reflection mirror 918, travels toward the positive side of the direction Y, and enters the light ray flux adjusting system 350.

The configurations of the light ray flux adjusting system 350 and the diffuser 380 are the same as those in the second embodiment.

The second light source unit 92 includes a third light source region 925, the collimation system 13, the homogenizer system 362, the collimation/light collection system 364, and a wavelength converter 927. The third light source region 925 corresponds to a region where the plurality of third semiconductor laser devices 921 are arranged in two rows, as described above, which is one of the regions that form the light source array 923.

The collimation system 13 substantially parallelizes the excitation light E. The collimation system 13 is formed of the convex lenses 131 provided in correspondence with the plurality of third semiconductor laser devices 921.

The configurations of the homogenizer system 362 and the collimation/light collection system 364 are the same as those in the second embodiment. The basic configuration of the wavelength converter 927 is the same as that in the second embodiment, but a phosphor layer 928 differs from the phosphor layer in the second embodiment.

The phosphor layer 928 contains a phosphor material that absorbs the excitation light E and produces green fluorescence GE having a peak wavelength that belongs to a wavelength band ranging, for example, from 500 to 590 nm.

The green fluorescence GE outputted from the wavelength converter 927 is parallelized by the collimation/light collection system 364. The second light source unit 92 thus outputs parallelized fluorescence GE exhibiting yellow, which differs from the color of the blue light B (first color light), and thicker than the first light BR.

The fluorescence GE in the present embodiment corresponds to the second color light and the second light in the claims.

The first light ray combining system 93 has the function of combining the fluorescence GE and the first light BR containing one of the blue light B0 and the red light R0 having exited out of the light ray flux adjusting system 350. The first light ray combining system 93 is formed of a dichroic mirror that transmits light that belongs to a blue band and light that belongs to a red band and reflects light that belongs to a green band.

The first light BR and the fluorescence GE thus exit out of the first light ray combining system 93 toward the negative side of the direction X. The first light BR and the fluorescence GE are hereinafter collectively referred to as illumination light LS.

The first light collection system 94 is formed of a first convex lens 941 and a second convex lens 942. The first light collection system 94 collects the illumination light LS having exited out of the first light ray combining system 93 and directs the collected illumination light LS toward a light incident end surface 95*a* of the rod integrator 95.

The rod integrator 95 is formed of a light transmissive member having a quadrangular columnar shape and has the light incident end surface 95*a*, a light exiting end surface 95*b*, and four reflection surfaces. When the illumination light LS passes through the rod integrator 95, the intensity distribution of the illumination light LS is homogenized.

The pickup system 96 is formed of a first convex lens 961 and a second convex lens 962. The pickup system 96 substantially parallelizes the illumination light LS having exited out of the rod integrator 95.

The second light collection system 97 is formed of a convex lens 972. The second light collection system 97 collects the illumination light LS having exited out of the pickup system 96 into a spot on the micromirror-type light modulator 450.

The light guide system 98 is formed of a reflection mirror. The light guide system 98 reflects the illumination light LS to cause the red light R0, the green light GE, and the blue light B0 to be incident on the micromirror-type light modulator 450 in a time division manner.

The light source controller 108 is configured to control the first light source region 911, the second light source region 912, and the third light source region 925 to output light independently from one another.

In the illuminator 106 according to the present embodiment, in which the light ray flux adjusting system 350 increases the thickness of the first light BR outputted from the first light source unit 91, the difference in thickness between first light BR3 and the parallelized fluorescence GE on the downstream of the light ray flux adjusting system 350 is smaller than the difference in thickness between the first light BR and the parallelized fluorescence GE on the upstream of the light ray flux adjusting system 350.

Further, adjusting the distance between the first reflector 351 and the second reflector 352 of the light ray flux adjusting system 350 allows the first light BR3 and the parallelized fluorescence GE to have substantially the same thickness on the downstream of the light ray flux adjusting system 350. As described above, in the illuminator 106 according to the present embodiment, the first light BR3 and the fluorescence GE configured to have substantially the same thickness enter the downstream optical system, whereby the color unevenness can thus be reduced.

Fourth Embodiment

A fourth embodiment of the invention will be described below with reference to FIG. 14.

The basic configuration of a projector according to the fourth embodiment is the same as that in the first embodiment, and the fourth embodiment differs from the first embodiment in terms of the configuration of the illuminator. Therefore, the entire projector will not be described, and only the illuminator will be described.

FIG. 14 is a schematic configuration diagram of an illuminator 120 according to the fourth embodiment.

In FIG. 14, the same components as those in the drawings used in the first embodiment have the same reference characters and will not be described.

The illuminator 120 according to the present embodiment includes the first light source unit 330, the optical path changing system 340, a light ray flux adjusting system 355, the second light source unit 360, the first light ray combining system 370, the diffuser 380, the optical integration system 70, the polarization converter 390, and the superimposing lens 80, as shown in FIG. 14.

The first light source unit 330 includes the first light source region 331 and the collimation system 13. The first light source regions 331 is formed of a plurality of first semiconductor laser devices 111, which each output the blue light B having the peak wavelength ranging, for example, from 460 to 480 nm. FIG. 14 shows one first semiconductor laser device 111, and a plurality of first semiconductor laser devices 111 are actually arranged in the direction perpendicular to the plane of view.

The second light source unit 360 includes the second light source region 361, the collimation system 13, the lens array 362B, the collimation/light collection system 364, and the wavelength converter 365. The second light source regions 361 is formed of a plurality of second semiconductor laser devices 363, which each output excitation light E having the peak wavelength ranging, for example, from 440 to 460 nm.

The excitation light E in the present embodiment corresponds to the fourth color light in the claims.

The collimation system 13 substantially parallelizes the blue light B outputted from each of the first semiconductor laser devices 111 and the excitation light E outputted from each of the second semiconductor laser devices 363. The collimation system 13 is formed of the convex lenses 131 provided in correspondence with the first semiconductor laser devices 111 and the plurality of second semiconductor laser devices 363. The plurality of blue light beams B outputted from the first light source region 331 and parallelized by the collimation system 13 form the blue light B0.

The lens array 362B produces divided light fluxes from the excitation light E and the blue light B having exited out of the collimation system 13 to increase the number of optical intensity peaks in the illumination receiving region illuminated with the excitation light E (phosphor layer 366 of wavelength converter 365) and an illumination receiving region illuminated with the blue light B (diffuser 380). The lens array 362B is formed of a plurality of lenses arranged in a matrix in a plane perpendicular to the optical axes of the excitation light E and the blue light B.

The configurations of the collimation/light collection system 364, the wavelength converter 365, and the optical path changing system 340 are the same as those of the illuminator 102 according to the second embodiment shown in FIG. 11 and will therefore not be described.

The light ray flux adjusting system 355 is provided on the downstream of the lens array 362B.

The light ray flux adjusting system 355 includes the first reflector 351, a third reflector 353, and the second reflector 352. The first reflector 251 and the third reflector 353 are each formed of a half-silvered mirror. The first reflector 351 therefore transmits the first component B1 of the blue light B0 and reflects the second component B2 of the blue light B0. The third reflector 353 transmits a component B11, which is part of the first component B1 having passed through the first reflector 351, and reflects component B12, which is the other part of the first component B1. The second reflector 352 reflects the component B11 having passed through the third reflector 353.

The first reflector 351, the third reflector 353, and the second reflector 352 are each so disposed as to incline by 45° with respect to each of the directions X and Y. The reflectance of the first reflector 351 and the third reflector 353 is desirably so set that the light fluxes reflected off the first reflector 351, the third reflector 353, and the second reflector 352 have substantially the same intensities.

The second component B2 is reflected off the first reflector 351 and travels toward the positive side of the direction Y. The component B1 is reflected off the third reflector 353 and travels toward the positive side of the direction Y. The component B11 is reflected off the second reflector 352 and travels toward the positive side of the direction Y. The light ray flux adjusting system 355 thus causes the blue light B to branch into the three components B2, B12 and B11, which travel in the same direction. The blue light B3 on the downstream of the light ray flux adjusting system 355 is therefore thicker than the blue light B0 on the upstream of the light ray flux adjusting system 355.

The fluorescence Y having a Lambertian light orientation distribution is emitted from the phosphor layer 366. The fluorescence Y outputted from the wavelength converter 365 is parallelized by the collimation/light collection system 364. The second light source unit 360 thus outputs parallelized fluorescence Y exhibiting yellow, which differs from the color of the blue light B0 (first color light), and thicker than the blue light B0.

The fluorescence Y in the present embodiment corresponds to the second color light and the second light in the claims.

The first light ray combining system 370 has the function of combining the fluorescence Y and the blue light B3 having exited out of the light ray flux adjusting system 355. The first light ray combining system 370 is formed of a dichroic mirror that transmits light that belongs to a blue band and reflects light that belongs to a yellow band. The dichroic mirror is so disposed as to incline by 45° with respect to the directions X and Y. The fluorescence Y is therefore reflected off the first light ray combining system 370. The blue light B3 passes through the first light ray combining system 370.

The fluorescence Y and the blue light B3 are thus combined with each other by the first light ray combining system 370 into the white illumination light W.

The diffuser 380 is provided in the optical path of the blue light B3 between the light ray flux adjusting system 355 and the first light ray combining system 370. The diffuser 380 is formed of a diffusing plate and diffuses the blue light B3 incident on the diffuser plate. The diffuser 380 is desirably formed of a low-diffusion diffusing plate having a diffusion angle ranging from 1 to 5 degrees in terms of full angle at half maximum. Too large a diffusion angle increases the amount of light that the downstream optical system cannot take in, resulting in an increase in optical loss. The diffuser 380 may be formed by blasting a glass plate into a frosted glass plate or by etching a glass plate to form convex or concave spherical shapes. The material of the diffuser 380 is not necessarily glass, and a quartz substrate, a sapphire substrate, or any other substrate may be used, that is, the glass plate only needs to be formed of a transparent member.

The configurations of the optical integration system 70, the wavelength converter 390, and the superimposing lens 80 are the same as those of the illuminator 102 according to the second embodiment shown in FIG. 11 and will therefore not be described.

Also in the illuminator 120 according to the present embodiment, which is provided with the light ray flux adjusting system 355, the difference in thickness between the blue light B3 and the parallelized fluorescence Y on the downstream of the light ray flux adjusting system 355 is smaller than the difference in thickness between the blue light B0 and the parallelized fluorescence Y on the upstream of the light ray flux adjusting system 355. The color unevenness can thus be reduced.

Further, the illuminator 120 according to the present embodiment, in which the blue light B3 having a width increased by the light ray flux adjusting system 355 is incident on the diffuser 380 so that the blue light B3 incident on the diffuser 380 has a wider angular distribution, allows the intensity distribution of the secondary light source images formed in the exiting pupil of the projection system 600 to be more uniform than in a case where no light ray flux adjusting system 355 is provided. As a result, speckles in an image projected on the screen SCR can be reduced.

Fifth Embodiment

A fifth embodiment of the invention will be described below with reference to FIG. 15.

The basic configuration of a projector according to the fifth embodiment is the same as that in the first embodiment, and the fifth embodiment differs from the first embodiment in terms of the configuration of the illuminator. Therefore, the entire projector will not be described, and only the illuminator will be described. Further, the basic configuration of the illuminator according to the fifth embodiment is the same as that in the fourth embodiment, and the fifth embodiment differs from the fourth embodiment in terms of the positional relationship between the homogenizer system and the optical path changing system.

FIG. 15 is a schematic configuration diagram of an illuminator 122 according to the fifth embodiment.

In FIG. 15, the same components as those in FIG. 14 used in the fourth embodiment have the same reference characters and will not be described.

In the illuminator 122 according to the present embodiment, the lens array 362A is provided on the downstream of the lens array 362B, as shown in FIG. 15. The lens array 362B and the lens array 362A homogenize the optical intensity distribution of the excitation light E having exited out of the collimation system 13 in the illumination receiving region illuminated with the excitation light E (phosphor layer 366 of wavelength converter 365). That is, the lens array 362B and the lens array 362A form the homogenizer system 362 for the wavelength converter 365. The lens array 362A is formed of a plurality of lenses arranged in a matrix in a plane perpendicular to the optical axes of the excitation light E and the blue light B, as is the lens array 362B.

The branch mirror 341 is provided in the optical path of the blue light B between the lens array 362B and the lens array 362A. The blue light B0 having passed through the lens array 362B is therefore incident on the branch mirror 341. The light ray flux adjusting system 355 is provided on the downstream of the lens array 362B.

The other configuration of the illuminator 122 is the same as that of the illuminator 120 according to the fourth embodiment.

The illuminator 122 according to the present embodiment also provides the same effects as those provided by the fourth embodiment, such as reduction in color unevenness and speckles in an image.

Further, according to the present embodiment, since the optical intensity distribution of the excitation light E on the phosphor layer 366 is homogenized by the lens array 362B and the lens array 362A, and the blue light B0 does not enter the lens array 362A, no loss of the blue light B0 at the lens array 362A occurs, whereby the amount of blue light B0 can be ensured, and the blue light B0 can be used with increased efficiency.

Sixth Embodiment

A sixth embodiment of the invention will be described below with reference to FIG. 16.

The basic configuration of a projector according to the sixth embodiment is the same as that in the first embodiment, and the sixth embodiment differs from the first embodiment in terms of the configuration of the illuminator. Therefore, the entire projector will not be described, and only the illuminator will be described. Further, the basic configuration of the illuminator according to the sixth embodiment is the same as that in the fifth embodiment, and the sixth embodiment differs from the fifth embodiment in terms of the positional relationship between the lens arrays and the optical path changing system.

FIG. 16 is a schematic configuration diagram of an illuminator 124 according to the sixth embodiment.

In FIG. 16, the same components as those in FIG. 15 used in the fifth embodiment have the same reference characters and will not be described.

In the illuminator 124 according to the present embodiment, the branch mirror 341 is provided in the optical path of the blue light B on the downstream of the lens array 362A, as shown in FIG. 16. The blue light B0 having passed through the homogenizer system 362 is therefore incident on the branch mirror 341. The light ray flux adjusting system 355 is provided on the downstream of the lens array 362B and the lens array 362A.

The other configuration of the illuminator 124 is the same as that of the illuminator 122 according to the fifth embodiment.

The illuminator 124 according to the present embodiment also provides the same effects as those provided by the fourth and fifth embodiments, such as reduction in color unevenness and speckles in an image.

Further, the illuminator 124 according to the present embodiment, in which the distance between the lens array 362A and the lens array 362B can be smaller than that in the illuminator 122 according to the fifth embodiment, can be reduced in size.

The technical range of the invention is not limited to the embodiments described above, and a variety of changes can be made thereto to the extent that the changes do not depart from the substance of the invention.

For example, the above embodiments have been described with reference to the case where the light ray flux adjusting system includes the first and second reflectors and causes incident light to branch into two components. Instead, the light ray flux adjusting system may include three or more reflectors and cause incident light to branch into three or more components to increase the thickness of the light. Further, a mirror-type reflector is not necessarily used, and a prism-type reflector may be used.

The third embodiment has been described with reference to the case where the red light R0, the green light GE, and the blue light B0 are outputted in a time division manner. Instead, the red light R0, the green light GE, and the blue light B0 may be simultaneously outputted to produce white light. In this case, a plurality of DMDs corresponding to the color light fluxes may be used, or a plurality of liquid crystal panels corresponding to the color light fluxes may be used.

In addition to the above, the number, the shape, the material, the arrangement, and other factors of each component of the illuminator and the projector can be changed as appropriate. Further, the above embodiments have been described with reference to the case where the illuminators according the invention are each incorporated in a projector, but not necessarily. The illuminators according to the invention may each be used as a lighting apparatus, a headlight of an automobile, and other components.

The entire disclosure of Japanese Patent Application No. 2017-075271, filed on Apr. 5, 2017 and Japanese Patent Application No. 2018-036866, filed on Mar. 1, 2018 are expressly incorporated by reference herein.

The invention claimed is:

1. An illuminator comprising:
   a first light source unit that includes a first light source region outputting parallelized first color light and outputs first light containing the first color light;
   a second light source unit that outputs parallelized second light formed of second color light having a color different from a color of the first color light;
   a light ray flux adjusting system provided in an optical path of the first light;
   a first light ray combining system having a function of combining the second light and the first light having passed through the light ray flux adjusting system; and
   a diffuser provided in the optical path of the first light between the light ray flux adjusting system and the first light ray combining system,
   wherein the light ray flux adjusting system includes a first reflector that transmits a first component of the first light and reflects a second component of the first light and a second reflector that reflects the first component having passed through the first reflector.

2. The illuminator according to claim 1,
   wherein the first light source unit further includes
   a second light source region that outputs parallelized third color light having a color different from the colors of the first color light and the second color light; and
   a second light ray combining system having a function of combining the first color light and the third color light,
   wherein the first light source unit outputs the first light containing at least one of the first color light and the third color light.

3. The illuminator according to claim 2,
   further comprising a light source controller,
   wherein the second light source unit includes a third light source region that outputs fourth color light and a wavelength converter that converts the fourth color light into the second color light, and
   the light source controller is configured to control the first light source region, the second light source region, and the third light source region to output light independently from one another.

4. The illuminator according to claim 3, wherein the first color light and the fourth color light belong to a blue region, the second color light belongs to a green region, and the third color light belongs to a red region.

5. The illuminator according to claim 4, wherein a peak wavelength of the fourth color light is shorter than a peak wavelength of the first color light.

6. The illuminator according to claim 1,
   wherein the second light source unit includes a second light source region that outputs fourth color light, a wavelength converter that converts the fourth color light into the second color light, at least one lens array provided on a downstream of the first and second light source regions, and a diffuser on which light having exited out of the light ray flux adjusting system is incident,
   wherein the light ray flux adjusting system is provided on a downstream of the at least one lens array.

7. A projector comprising:
   the illuminator according to claim 1;
   a light modulator that modulates light from the illuminator in accordance with image information to form image light; and
   a projection system that projects the image light.

8. An illuminator comprising:
   a first light source unit that includes a first light source region outputting parallelized first color light and outputs first light containing the first color light;
   a second light source unit that outputs parallelized second light formed of second color light having a color different from a color of the first color light;
   a light ray flux adjusting system provided in an optical path of the first light;

a first light ray combining system having a function of combining the second light and the first light having passed through the light ray flux adjusting system; and a diffuser on which light having exited out of the first light ray combining system is incident, wherein the light ray flux adjusting system includes a first reflector that transmits a first component of the first light and reflects a second component of the first light and a second reflector that reflects the second component reflected off the first reflector.

9. The illuminator according to claim 8, wherein the light ray flux adjusting system includes an afocal system.

10. The illuminator according to claim 9, wherein the first light source region includes a laser device, and a lengthwise direction of a light exiting region of the laser device is parallel to a direction in which the first reflector reflects the second component.

11. The illuminator according to claim 9, further comprising:

a first light ray combining system having a function of combining the second light and the first light having passed through the light ray flux adjusting system; and a diffuser on which light having exited out of the first light ray combining system is incident.

12. The illuminator according to claim 8, wherein the first light source region includes a laser device, and a lengthwise direction of a light exiting region of the laser device is parallel to a direction in which the first reflector reflects the second component.

13. A projector comprising:

the illuminator according to claim 8;

a light modulator that modulates light from the illuminator in accordance with image information to form image light; and a projection system that projects the image light.

* * * * *